United States Patent
Rude et al.

(10) Patent No.: US 7,254,217 B2
(45) Date of Patent: Aug. 7, 2007

(54) FAULT CHARACTERIZATION USING INFORMATION INDICATIVE OF ECHO

(75) Inventors: Michael J. Rude, Minnetonka, MN (US); Ronald R. Gerlach, Orange, CA (US); Mo-Ching Justine Lau, Orange, CA (US); Tiet Pham, Irvine, CA (US); William W. Lu, Irvine, CA (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 654 days.

(21) Appl. No.: 10/462,431

(22) Filed: Jun. 16, 2003

(65) Prior Publication Data

US 2004/0114752 A1 Jun. 17, 2004

Related U.S. Application Data

(63) Continuation-in-part of application No. 10/317,946, filed on Dec. 12, 2002.

(51) Int. Cl.
*H04M 1/24* (2006.01)
*H04M 3/08* (2006.01)
*H04M 3/22* (2006.01)

(52) U.S. Cl. ............ 379/3; 379/22.03; 379/22.08; 379/24; 370/242; 375/227

(58) Field of Classification Search ............ 379/1.01, 379/1.04, 3, 14.01, 10.01, 15.05, 22, 24, 379/22.03–22.04, 27.02–27.03, 28, 406.01, 379/406.02, 22.08; 324/500, 512, 531, 533; 375/232, 350, 219, 224, 227, 230; 370/241–242, 370/248–249, 286, 359
See application file for complete search history.

(56) References Cited

U.S. PATENT DOCUMENTS

| | | | |
|---|---|---|---|
| 4,547,633 A * | 10/1985 | Szechenyi | 370/242 |
| 4,859,951 A * | 8/1989 | Cole et al. | 324/534 |
| 5,289,539 A | 2/1994 | Maruyama | |
| 5,610,909 A | 3/1997 | Shaw | |
| 5,664,011 A | 9/1997 | Crochiere et al. | |
| 5,796,820 A | 8/1998 | Sasada | |
| 6,185,301 B1 | 2/2001 | Muraoka | |
| 6,337,907 B1 | 1/2002 | Laberteaux et al. | |
| 7,023,963 B1 * | 4/2006 | Chu et al. | 379/15.05 |
| 2004/0013178 A1 * | 1/2004 | Bui et al. | 375/219 |
| 2004/0013208 A1 * | 1/2004 | Bui et al. | 375/316 |
| 2004/0032921 A1 * | 2/2004 | Bui | 375/350 |
| 2004/0114729 A1 | 6/2004 | Rude | |

FOREIGN PATENT DOCUMENTS

EP 0268391 A1 * 5/1988

* cited by examiner

*Primary Examiner*—Binh K. Tieu
(74) *Attorney, Agent, or Firm*—Fogg & Powers LLC; Jon M. Powers

(57) ABSTRACT

A fault associated with a communication medium is analyzed by correlating a first set of information indicative of echo associated with the communication medium with a second set of information indicative of echo. The fault is characterized based on the correlation between the first set of information and the second set of information. The first set of information and the second set of information can include echo canceller coefficients generated by an echo canceller coupled to the communication medium.

124 Claims, 10 Drawing Sheets

FAULT CHARACTERIZATION USING INFORMATION INDICATIVE OF ECHO

RELATED APPLICATIONS

The present application is a continuation-in-part (CIP) of the following co-pending U.S. patent application Ser. No. 10/317,946, filed Dec. 12, 2002, titled "FAULT CHARACTERIZATION USING INFORMATION INDICATIVE OF ECHO."

TECHNICAL FIELD

The following description relates to telecommunications in general and to digital subscriber line (DSL) devices in particular.

BACKGROUND

Telecommunication service providers use a variety of techniques to troubleshoot faults occurring in systems that use a copper twisted-pair telephone line (also referred to here as a "local loop"). Typically, a fault such as an open circuit or a short circuit in a local loop is found using either a handheld testset or by a mechanized metallic loop test (MLT) system. These devices are normally able to measure the distance from the test device to the loop fault. In some situations, this approach can reduce the circuit restoral time as well as associated labor cost.

Although nearly all plain old telephone service (POTS) circuits are attached to such an MLT system, a large number of fielded high speed digital subscriber line (HDSL) circuits are not. These HDSL circuits include HDSL, HDSL2, and HDSL4 circuits, which are also collectively referred to here as "HDSLx" circuits. These HDSLx circuits typically carry critical DS1 data and have mean-time-to-restoral (MTTR) times that are typically subject to service level agreements. Returning these HDSLx circuits to service quickly after a fault is typically a high priority for service providers.

SUMMARY

In one embodiment, a method of analyzing an analyzed fault associated with an analyzed communication medium includes receiving a plurality of sets of first echo canceller coefficients from an echo canceller. Each of the plurality of sets of first echo canceller coefficients has an associated degree of convergence. The method further includes selecting one of the plurality of sets of first echo canceller coefficients based on the degree of convergence associated with each of the plurality of sets of first echo canceller coefficients. The method further includes receiving an echo canceller profile. In such an embodiment, the echo canceller profile includes at least one set of profile echo canceller coefficients. The method further includes correlating the selected set of first echo canceller coefficients with at least one of the sets of profile echo canceller coefficients included in the echo canceller profile. The method further includes characterizing the analyzed fault based on the correlation between the selected set of first echo canceller coefficients and the at least one of the sets of profile echo canceller coefficients included in the echo canceller profile.

In one embodiment, a method of analyzing an analyzed fault associated with an analyzed communication medium includes receiving a plurality of second sets of information indicative of echo and selecting one of the second sets of information indicative of echo. The method further includes correlating a first set of information indicative of echo associated with the analyzed communication medium with the selected second set. The method further includes characterizing the analyzed fault based on the correlation between the first set and the selected second set.

In one embodiment, a method of analyzing an analyzed fault associated with an analyzed communication medium includes receiving an echo canceller profile. In such an embodiment, the echo canceller profile includes a plurality of sets of profile echo canceller coefficients. The method includes correlating a set of first echo canceller coefficients received from an echo canceller with at least a subset of the plurality of sets of profile echo canceller coefficients included in the echo canceller profile to create a correlation coefficient for each set of the profile echo canceller coefficients included in the subset. The method further includes characterizing the analyzed fault based on the correlations between the set of first echo canceller coefficients and the subset of the plurality of the sets of profile echo canceller coefficients included in the echo canceller profile. In such an embodiment, characterizing the analyzed fault includes selecting the set of profile echo canceller coefficients having a highest correlation coefficient. In such an embodiment, characterizing the analyzed fault further includes when the highest correlation coefficient is greater than a threshold correlation value, providing a first attribute associated with the selected set of profile echo canceller coefficients.

In one embodiment, a line interface unit that analyzes an analyzed fault associated with an analyzed communication medium includes a first interface adapted to couple the line interface unit to a first communication link. The line interface unit further includes an echo canceller coupled to the first communication link and a controller coupled to the echo canceller. The controller is adapted to receive a plurality of sets of first echo canceller coefficients from the echo canceller. In such an embodiment, each of the sets of first echo canceller coefficients has an associated degree of convergence. The controller is further adapted to select one of the plurality of sets of first echo canceller coefficients based on the degree of convergence associated with each of the plurality of sets of first echo canceller coefficients. The controller is further adapted to receive an echo canceller profile. In such an embodiment, the echo canceller profile includes at least one set of profile echo canceller coefficients. The controller further adapted to correlate the selected set of first echo canceller coefficients with at least one of the sets of profile echo canceller coefficients included in the echo canceller profile. The controller is further adapted to characterize the fault based on the correlation between the selected set of first echo canceller coefficients and the at least one of the sets of profile echo canceller coefficients included in the echo canceller profile.

In one embodiment, a line interface unit that analyzes an analyzed fault associated with an analyzed communication medium includes a first interface adapted to couple the line interface unit to a first communication link. The line interface unit further includes an echo canceller coupled to the first communication link and a controller coupled to the echo canceller. In such an embodiment, the controller is adapted t: receive a plurality of second sets of information indicative of echo and select one of the second sets of information indicative of echo. In such an embodiment, the controller is further adapted to correlate a first set of information indicative of echo associated with the analyzed communication medium with the selected second set. In such an embodiment, the controller is further adapted to characterize the analyzed fault based on the correlation between the first set and the selected second set.

In one embodiment, a line interface unit that analyzes an analyzed fault associated with an analyzed communication medium includes a first interface adapted to couple the line interface unit to a first communication link. The line interface unit further includes an echo canceller coupled to the first communication link and a controller coupled to the echo canceller. In such an embodiment, the controller is adapted to receive an echo canceller profile. In such an embodiment, the echo canceller profile includes a plurality of sets of profile echo canceller coefficients. In such an embodiment, the controller is further adapted to correlate a set of first echo canceller coefficients received from an echo canceller with at least a subset of the plurality of sets of profile echo canceller coefficients included in the echo canceller profile to create a correlation coefficient for each set of the profile echo canceller coefficients included in the subset. In such an embodiment, the controller is further adapted to characterize the analyzed fault based on the correlations between the set of first echo canceller coefficients and the subset of the plurality of the sets of profile echo canceller coefficients included in the echo canceller profile. In such an embodiment, the controller is further adapted, in order to characterize the analyzed fault, to: select the set of profile echo canceller coefficients having the highest correlation coefficient, and, when the highest correlation coefficient is greater than a threshold correlation value, provide a first attribute associated with the selected set of profile echo canceller coefficients.

In one embodiment, a telecommunication device that analyzes an analyzed fault associated with an analyzed communication medium includes an interface adapted to couple the telecommunication device to a communication medium and an echo canceller coupled to the interface. In such an embodiment, the telecommunication device is adapted to receive a plurality of sets of first echo canceller coefficients from the echo canceller. In such an embodiment, each of the sets of first echo canceller coefficients has an associated degree of convergence. In such an embodiment, the telecommunications device is further adapted to select one of the plurality of sets of first echo canceller coefficients based on the degree of convergence associated with each of the plurality of sets of first echo canceller coefficients. In such an embodiment, the telecommunications device is further adapted to receive an echo canceller profile. In such an embodiment, the echo canceller profile includes at least one set of profile echo canceller coefficients. In such an embodiment, the telecommunications device is further adapted to correlate the selected set of first echo canceller coefficients with at least one of the sets of profile echo canceller coefficients included in the echo canceller profile. In such an embodiment, the telecommunications device is further adapted to characterize the fault based on the correlation between the selected set of first echo canceller coefficients and the at least one of the sets of profile echo canceller coefficients included in the echo canceller profile.

In one embodiment, a telecommunication device that analyzes an analyzed fault associated with an analyzed communication medium includes an interface adapted to couple the telecommunication device to a communication medium and an echo canceller coupled to the interface. In such an embodiment, the telecommunication device is adapted to receive a plurality of second sets of information indicative of echo and select one of the second sets of information indicative of echo. In such an embodiment, the telecommunications device is further adapted to correlate a first set of information indicative of echo associated with the analyzed communication medium with the selected second set, and characterize the analyzed fault based on the correlation between the first set and the selected second set.

In one embodiment, a telecommunication device that analyzes an analyzed fault associated with an analyzed communication medium includes an interface adapted to couple the telecommunication device to a communication medium and an echo canceller coupled to the interface. In such an embodiment, the telecommunication device is adapted to receive an echo canceller profile. In such an embodiment, the echo canceller profile includes a plurality of sets of profile echo canceller coefficients. In such an embodiment, the telecommunications device is further adapted to correlate a set of first echo canceller coefficients received from an echo canceller with at least a subset of the plurality of sets of profile echo canceller coefficients included in the echo canceller profile to create a correlation coefficient for each set of the profile echo canceller coefficients included in the subset. In such an embodiment, the telecommunications device is further adapted to characterize the analyzed fault based on the correlations between the set of first echo canceller coefficients and the subset of the plurality of the sets of profile echo canceller coefficients included in the echo canceller profile. In such an embodiment, the telecommunication device is further adapted, in order to characterize the analyzed fault, to: select the set of profile echo canceller coefficients having the highest correlation coefficient, and, when the highest correlation coefficient is greater than a threshold correlation value, provide a first attribute associated with the selected set of profile echo canceller coefficients. The details of one or more embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
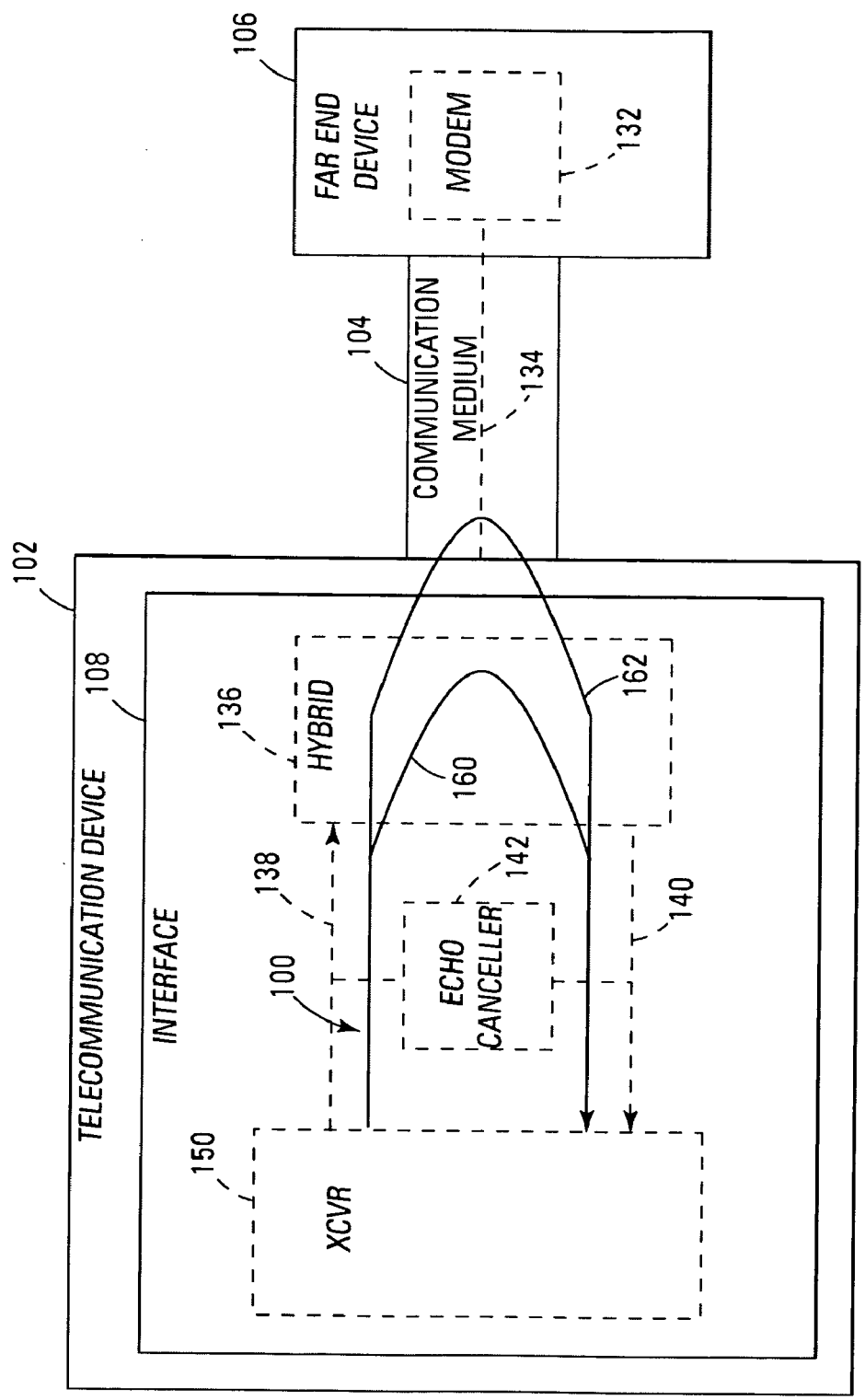
FIG. 1 is a block diagram illustrating echo in a telecommunication device coupled to a communication medium.

FIG. 1 is a block diagram illustrating echo 100 in a telecommunication device 102 coupled to a communication medium 104. Device 102 is coupled to a far-end device 106 via the communication medium 104. Device 102 includes an interface 108 that couples the rest of the components of the device 102 to the communication medium 104. Typically, there is echo 100 that occurs in the device 102. Echo 100 is caused by impedance mismatches between the device 102 and the communication medium 104. A fault, such as an open circuit or a short circuit, occurring in the communication medium 104 between the device 102 and the far-end device 106 can cause impedance mismatches and, as a result, echo.

For example, in one embodiment illustrated with dashed lines in FIG. 1, device 102 is a line interface unit. In such an embodiment, the far-end device 106 includes a modem 132, and the communication medium 104 includes a twisted-pair telephone line 134. The line interface unit is coupled to the modem 132 via the twisted-pair telephone line 134.

The interface 108 includes a hybrid circuit 136. Hybrid circuit 136 converts the two-line twisted-pair telephone line 134 into a 4-line connection that is coupled to a transceiver 150. This 4-line connection includes a separate 2-line transmit path 138 and a receive path 140.

Hybrid circuit 136 is designed to isolate signals on the transmit path 138 from signals on the receive path 140. Theoretically, hybrid circuit 136 can achieve perfect isolation under matched impedance conditions. In practice, however, perfect impedance matching is unlikely and a portion of the signal transmitted on the transmit path 138 reflects back along the receive path 140. This reflection is included in echo 100 and is referred to here as hybrid echo 160. In such an embodiment, other reflections (referred to here as line echo 162) included in echo 100 may also result from normal loop conditions such as bridge taps, wire gauge changes, and the like. The line echo 162 may also result from faults occurring in the twisted-pair telephone line 134.

Echo may be acceptable and even desirable in POTS service since echo allows a speaker to hear his or her own attenuated voice through the ear piece. However, in some situations, echo limits data transmission in HDSLx service, since echo can create a high "noise floor," which can limit the signal-to-noise ratio (SNR). In HDSLx applications, an echo canceller 142 is typically used to cancel at least a portion of the echo 100. In one embodiment, echo canceller 142 is implemented using an adaptive filter that estimates the amount of echo 100 by constantly updating a set of echo coefficients. The estimate of the echo 100 is subtracted from the received signal from the receive path 140. In such an implementation, the echo canceller 142 is typically implemented in an application-specific integrated circuit (ASIC).

Figure 2:
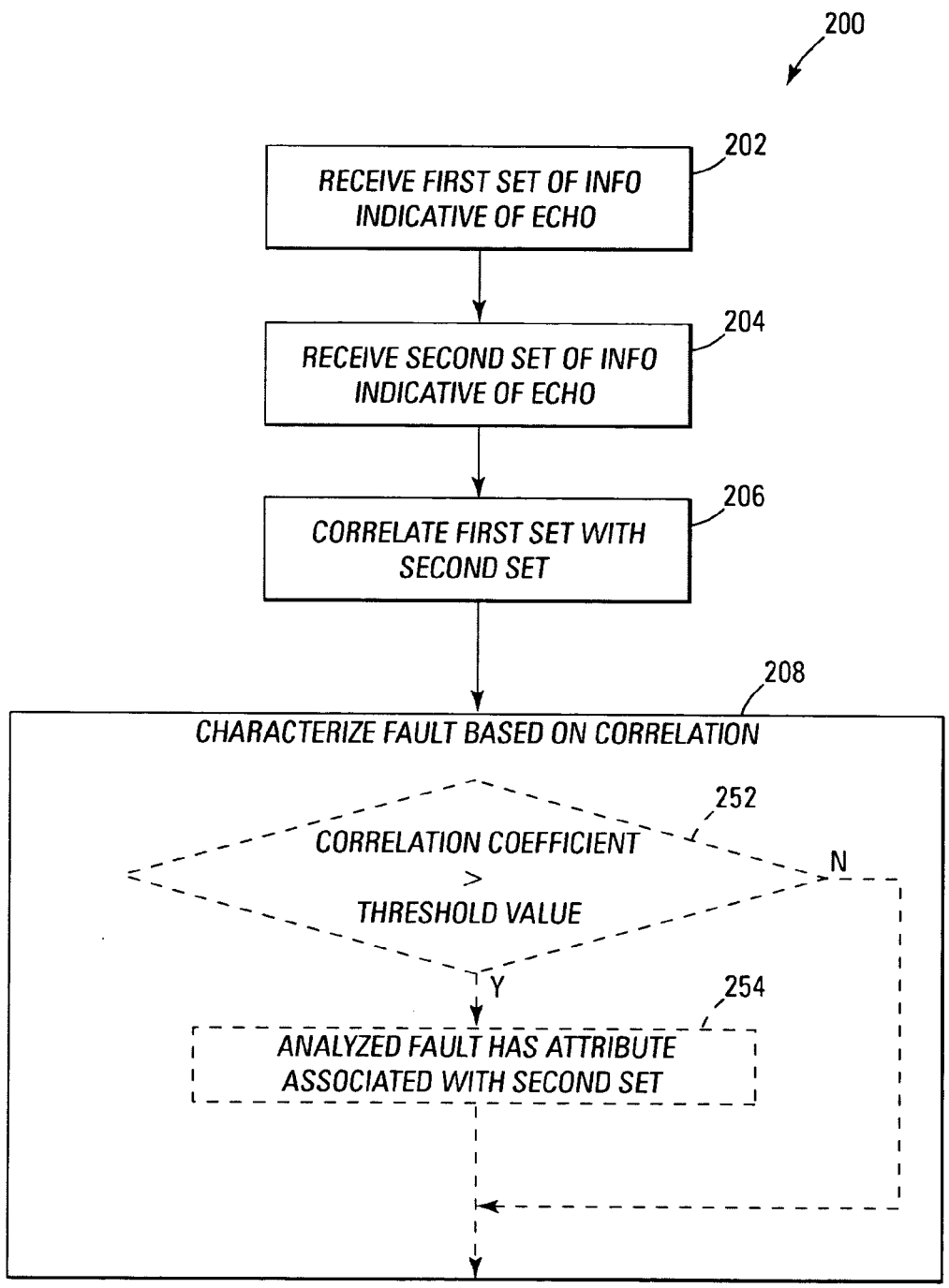
FIG. 2 is a flow diagram of one embodiment of a method of analyzing a fault associated with a communication medium.

FIG. 2 is a flow diagram of one embodiment of a method 200 of analyzing a fault associated with a communication medium. The fault to be analyzed is referred to here as the "analyzed fault." The communication medium that is analyzed is referred to here as the "analyzed communication medium" or "analyzed medium." The analyzed fault can be, for example, a short circuit or an open circuit. Moreover, it is to be understood that analysis may determine that there is no fault in the analyzed communication medium. For example, this may be because there is no fault at all or that any fault is located somewhere other than in the analyzed communication medium. In one embodiment, the analyzed communication medium is a twisted-pair telephone line coupled to an HDSLx line interface unit. In such an embodiment, a far-end device such as an HDSLx modem or a remote terminal need not be coupled to the other end of the telephone line in order to analyze the analyzed fault. Embodiments of method 200 are suitable, for example, for use with a telecommunication device that employs an echo canceller and communicates over one or more twisted-pair telephone lines.

Method 200, shown in FIG. 2, includes receiving a first set of information indicative of echo associated with the analyzed communication medium (block 202). In one embodiment, the first set of information is a set of echo canceller coefficients from an echo canceller coupled to the analyzed communication medium. For example, in such an embodiment, the set of echo canceller coefficients includes echo canceller coefficients currently used by the echo canceller. The set of echo canceller coefficients are received, in such an embodiment, from the echo canceller by a controller. In other embodiments, the first set of information (for example, a set of echo canceller coefficients) is retrieved from a memory such as a RAM or ROM, or is otherwise generated or calculated.

Method 200 also includes receiving a second set of information indicative of echo (block 204). In one embodiment, the second set of information is a set of echo canceller coefficients corresponding to a known fault in the analyzed communication medium or a communication medium similar to the analyzed communication medium. For example, in one implementation of such an embodiment, prior to normal operation, an echo canceller coupled to a communication medium similar to the analyzed communication medium is operated with the known fault in the communication medium. Then, a set of echo canceller coefficients resulting from operating the echo canceller with the known fault is saved and stored in a memory such as ROM or RAM for later retrieval. In such an embodiment, a controller or other device retrieves the set of saved echo canceller coefficients from the memory. In one implementation of such an embodiment, multiple sets of echo canceller coefficients are generated under various conditions (including, for example, various fault conditions and various communication media). In other embodiments, the second set of information (for example, a set of echo canceller coefficients) is otherwise generated or calculated.

Method 200 also includes correlating the first set of information with the second set of information (block 206). For example, in one embodiment, a first set of echo canceller coefficients are correlated with a second set of echo canceller coefficients. In one implementation of such an embodiment, a normalized covariance correlation is performed in order to obtain a correlation coefficient between the first set of echo canceller coefficients and the second set of echo canceller coefficients. Other ways of correlating the first and second sets of echo canceller coefficients can be used, for example, using higher order statistics and/or neural networks.

Then, the analyzed fault is characterized based on the correlation between the first set of information and the second set of information (block 208). For example, in one embodiment (shown in FIG. 2 with dashed lines), a first and second set of echo canceller coefficients are correlated and a resulting correlation coefficient is compared to a threshold coefficient value (block 252). If the correlation coefficient is greater than (or greater than or equal to) the threshold coefficient value, a determination is made that the analyzed fault has an attribute associated with the second set of echo canceller coefficients (block 254). In implementations where a known fault is associated with the second set of echo canceller coefficients, a determination is made that the analyzed fault has an attribute of the known fault associated with the second set of echo canceller coefficients. For example, in one case, a determination is made that the analyzed fault is of the same type (for example, an open circuit or short circuit) as the known fault associated with the second set of echo canceller coefficients.

In implementations of such an embodiment, if the correlation coefficient is less than (or less than or equal to) the threshold coefficients value, a determination is made that there is not a fault in the communication having an attribute associated with the second set of echo canceller coefficients. In other implementations, no determination is made if the correlation coefficient is less than the threshold coefficients value.

In another embodiment, a known fault having a known location within (or otherwise in relation to) to the analyzed medium (or a medium similar to the analyzed medium) is associated with the second set of echo canceller coefficients. In such an embodiment, if a correlation coefficient between a first set of echo canceller coefficients and the second set of echo canceller coefficients is greater than (or greater than or equal to) a threshold coefficient value, a determination is made that the analyzed fault is of the same type as the known fault and is at the same location within the analyzed medium as the known fault. The second set of echo canceller coefficients, in one implementation of such an embodiment, includes several groups of echo canceller coefficients associated with multiple known faults located at various locations within the analyzed medium (or a medium similar to the analyzed medium). Each group of echo canceller coefficients is associated with one of the multiple known faults, each of which is located at one of the multiple locations within the analyzed medium (or a medium similar to the analyzed medium). When an analyzed fault is characterized, the first set of echo canceller coefficients is correlated with one or more of the groups of echo canceller coefficients included in the second set of echo canceller coefficients. If a correlation coefficient resulting from correlating the first set of echo canceller coefficients with a particular group is greater than a threshold correlation value, then a determination is made that the analyzed fault is at the location associated with the particular group.

In one implementation of such an embodiment, this location data is used (for example, by a service provider) to identify whether the analyzed fault is within a central office or outside of the central office in the outside plant. In such an implementation, locations that are within the central office and locations that are outside of the central office in the outside plant are identified. If, as result of performing an embodiment of method 200, an analyzed fault is identified as having a location that is associated with the central office, a determination is made that the analyzed fault is within the central office. If an analyzed fault is identified as having a location that is associated with the outside plant, a determination is made that the analyzed fault is in the outside plant.

Whether the analyzed fault is within the central office or outside of the central office in the outside plant can provide a useful data point for service providers. A service provider can use this data point to assist in the dispatch of repair technicians. In some situations, this has value because central office technicians and outside plant technicians have different skill levels, work rules, and the like. For example, if a loop fault is identified as being in the central office, then an expensive outside plant service dispatch can be avoided. Alternatively, if a loop fault is identified as being in the outside plant, then an outside plant technician can be immediately dispatched to minimize MTTR.

In other embodiments, the analyzed fault is characterized in other ways. Although method 200 is depicted in FIG. 2 with the elements of method 200 occurring in a particular order, it is to be understood that the elements of method 200 can occur in a different order or certain elements can occur in parallel.

Method 200 allows a fault associated with a communication medium to be analyzed using information indicative of echo associated with the communication medium. In those embodiments where such information is used for other purposes (such as echo cancellation), resources and costs associated with providing such a fault analysis capability can be reduced by using existing functionality to obtain such information.

Moreover, embodiments of method 200 that make use of an echo canceller can be operated in a single-ended manner that does not require a far-end device to be coupled to the communication medium in order for the fault to be characterized. Such embodiments can allow a service provider (such as a provider of HDSLx service) to characterize a fault without having to access equipment located at a customer's premise. This can reduce costs and delays associated with sending a technician to a customer's premise in order to access such equipment.

Figure 3:
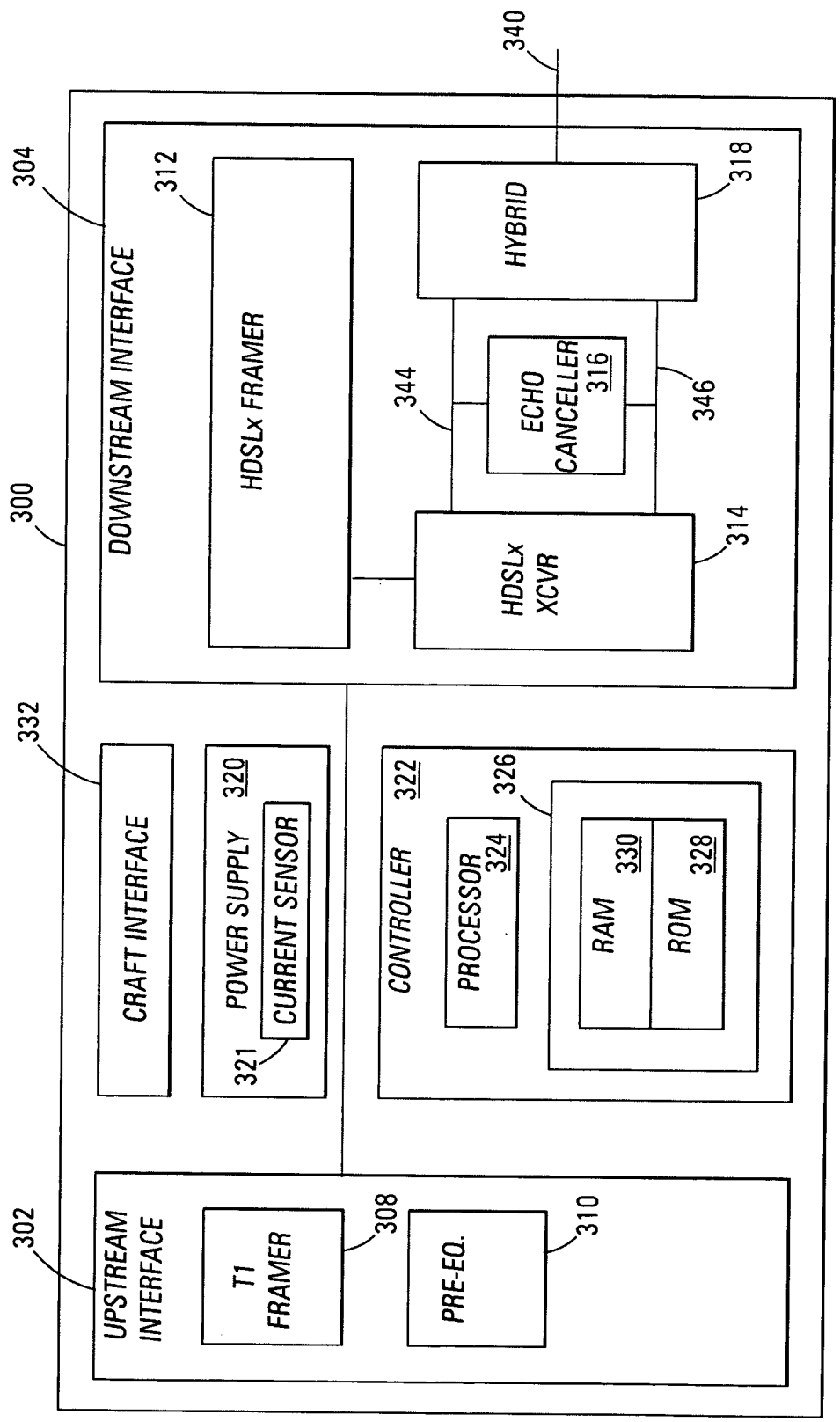
FIG. 3 is a block diagram of one embodiment of an HDSL2 line interface unit.

FIG. 3 is a block diagram of one embodiment of an HDSLx line interface unit 300 (also referred to here as a "line card" 300). In one embodiment, the line card 300 is used to implement the methods and apparatus described here. Line card 300 is used to send and receive DS1 traffic over an HDSLx communication link using at least one twisted-pair telephone line 340 (also referred to here as a "local loop" or "loop"). For example, in one embodiment, the line card 300 is an HDSL2 line interface unit that is used to send and receive DS1 traffic over an HDSL2 link using a single twisted-pair telephone line.

The line card 300 includes an upstream interface 302 and a downstream interface 304. Upstream interface 302 and downstream interface 304 couple the line card 300 to an upstream link and a downstream link, respectively. In the embodiment shown in FIG. 3, the upstream link is a DSX-1 link that is cross-connected to a time division-multiplexing network. The upstream interface 302 couples the line card 300 to the DSX-1 link and includes, for example, a T1 framer 308 and a DSX-1 pre-equalizer 310. In the embodiment shown in FIG. 3, the downstream link is an HDSLx link such as an HDSL, HDSL2, or HDSL4 link. The downstream interface 304 couples the line card 300 to the HDSLx link. The HDSLx link is implemented using the twisted-pair telephone line 340. The downstream interface 304 includes, for example, an HDSLx framer 312, an HDSLx transceiver 314, an echo canceller 316, and a hybrid circuit 318.

The line card 300 includes a power supply 320 for providing power to the various components of the line card 300. Also, in the embodiment shown in FIG. 3, the power supply 320 includes a current sensor 321. Current sensor 321, in one implementation, is used to perform a current test by applying a predetermined voltage to the telephone line 340 and measuring the resulting current. The line card 300 also includes a controller 322. For example, in the embodiment shown in FIG. 3, the controller 322 includes a programmable processor 324 (such as a microprocessor) and a memory 326. Memory 326 includes both read-only memory ("ROM") 328 and random access memory ("RAM") 330. Although memory 326 is shown in FIG. 3 as having a separate ROM 328 and RAM 330, other memory configurations can be used, for example, using scratchpad memory included in the programmable processor 324.

Line card 300 also includes a craft interface 332. Craft interface 332 includes, for example, a universal asynchronous receiver-transmitter ("UART") that couples an RS-232 serial port to the controller 322. A user can connect a portable computer or other data terminal to the serial port and communicate with an embedded control program executing on the programmable processor 324. Alternatively, the user can communicate with the embedded control program over an embedded operations channel carried among the DS1 traffic handled by the line card 300.

The hybrid circuit 318 converts a 2-wire, full-duplex twisted-pair telephone line 340 into a separate 2-wire transmit path 344 and a separate 2-wire receive path 346. Echo canceller 316 is used to cancel at least a portion of any echo. In one embodiment, echo canceller 316 is implemented using an adaptive filter that estimates the amount of echo by constantly updating a set of echo coefficients. The estimate of the echo is subtracted from the received signal from the receive path 346. In such an embodiment, the echo canceller 316 is implemented in an ASIC.

In operation, the line card 300 receives DS1 traffic from the downstream link on the downstream interface 304. The incoming DS1 traffic is formatted as HDSL frames. The downstream interface 304 processes the incoming frames and communicates the DS1 traffic to the upstream interface 302. The upstream interface 302 formats the DS1 traffic into T1 frames and transmits the frames out on the upstream link. A similar process occurs in reverse for DS1 traffic received on the upstream interface 302 from the upstream link. The incoming DS1 traffic is formatted as T1 frames. The upstream interface 302 processes the incoming frames and communicates the DS1 traffic to the downstream interface 304. The downstream interface 304 formats the DS1 traffic into HDSL frames and transmits the frames out on the downstream link. Although FIG. 3 depicts an HDSLx line interface unit, other telecommunications devices can be used to implement the techniques described here. For example, G.SHDSL or asynchronous digital subscriber line (ADSL) devices can be used.

Embodiments of method 200 can be implemented using line card 300. In one such embodiment, the analyzed communication medium is the telephone line 340 (referred to here as the "analyzed line"), which is coupled to the line card 300. In this embodiment, an HDSL2 modem or other remote device need not be coupled to the other end of the analyzed line in order to analyze an analyzed fault.

In this embodiment, the second set of information indicative of echo includes an echo canceller profile. The echo canceller profile includes at least one set of echo canceller coefficients (referred to here as the "profile echo canceller coefficients"). In one implementation of this embodiment, the profile echo canceller coefficients are generated by operating the same line card 300 used to analyze the analyzed fault while the line card 300 is coupled to the analyzed line. In other implementations, the profile echo canceller coefficients are generated using other techniques. For example, in one such other implementation, the profile echo canceller coefficients are generated by operating the same line card 300 used to analyze the analyzed fault while the line card 300 is coupled to a telephone line other than the analyzed line. In other implementations, the profile echo canceller coefficients are generated by operating a line card other than the line card 300 used to analyze the analyzed fault. For example, in one such implementation, a line card of the same type as the line card 300 used to analyze the analyze fault is used.

In one implementation of this embodiment, the set of profile echo canceller coefficients is generated as a part of the manufacturing process. The echo canceller of a line card (for example, the line card 300 used to analyze the analyzed fault or a line card similar thereto) is operated with one or more known fault conditions in the telephone line to which the line interface is coupled (for example, the analyzed line or another telephone line). The echo canceller coefficients for the known fault conditions are saved and included in the echo canceller profile. During operation, the saved echo canceller profile is retrieved and used. In other implementations, a similar procedure is used to generate the echo canceller profile during installation of the line card 300.

For example, in one implementation of this embodiment, the set of profile echo canceller coefficients are generated by operating the echo canceller while the echo canceller is coupled to a twisted-pair telephone line that is configured to model the expected operating environment of the line card. In one example, an echo canceller is coupled to a telephone line having sections with different attributes. For example, in one such implementation, an canceller is coupled to a telephone line having a 1000 foot section that uses 24 AWG wire and an 8000 foot section that uses 26 AWG wire. Examples of other line configurations include using a single-gauge telephone line (for example, 26 AWG wire). Then, multiple sets of profile echo canceller coefficients are generated under various fault conditions. In other examples, echo canceller coefficients generated using multiple line configurations are included in the echo canceller profile. Moreover, in other implementations, the echo canceller coefficients included in the echo canceller profile are calculated, for example, by running simulations (or using other mathematical techniques) that model operation of the echo canceller under various fault conditions and various line configurations.

In other implementations of this embodiment, the echo canceller profile is created in other ways. For example, the echo canceller profile is created by calculating a set of profile echo canceller coefficients in one such other implementation. In implementations of this embodiment, the echo canceller profile is periodically updated (for example, by recalculating a set of profile echo canceller coefficients) and saved during operation of the line card 300. The echo canceller profile is updated, for example, to reflect changes in analyzed line or other operating conditions.

In this embodiment, the first set of information indicative of echo associated with the analyzed line includes a set of echo canceller coefficients generated by the echo canceller 316 of the line card 300. The set of echo canceller coefficients generated by the echo canceller 316 in this embodiment is referred to here as the "set of first echo canceller coefficients." In one implementation, the set of first echo canceller coefficients includes echo canceller coefficients generated by the echo canceller 316 during operation of the line card 300 in a fault test mode. The set of first echo canceller coefficients is received, in such an implementation, by the programmable processor 324 from the echo canceller 316. In other implementations, the set of first echo canceller coefficients includes echo canceller coefficients generated by the echo canceller 316 during the normal operating mode of the line card 300.

Figure 4:
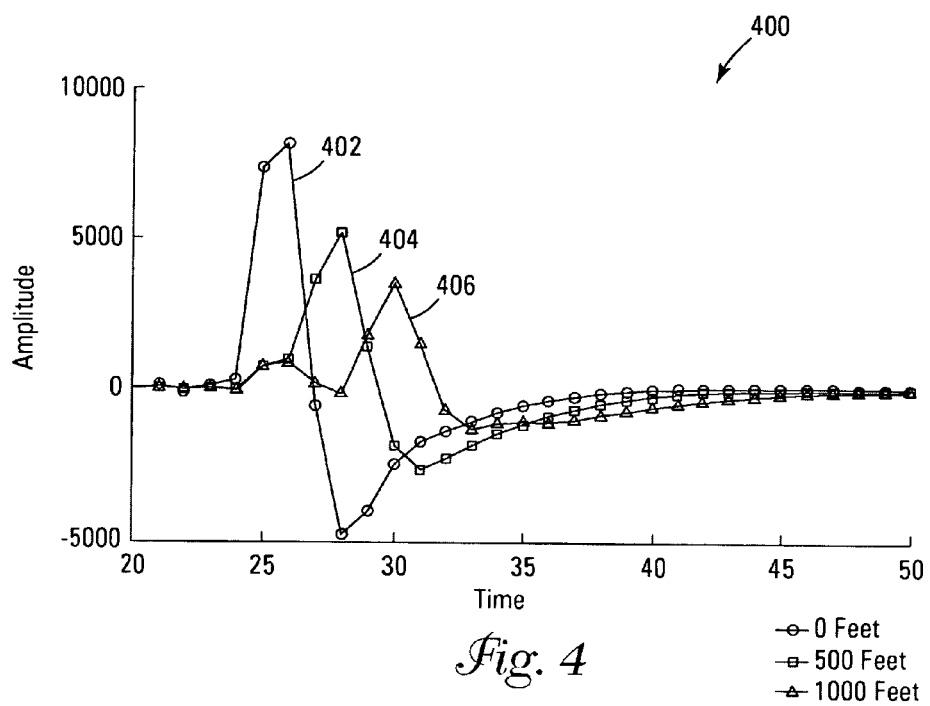
FIG. 4 is a chart showing exemplary echo responses of a hybrid circuit from one implementation of an HDSL2 line interface unit under various open-circuit faults.
Figure 5:
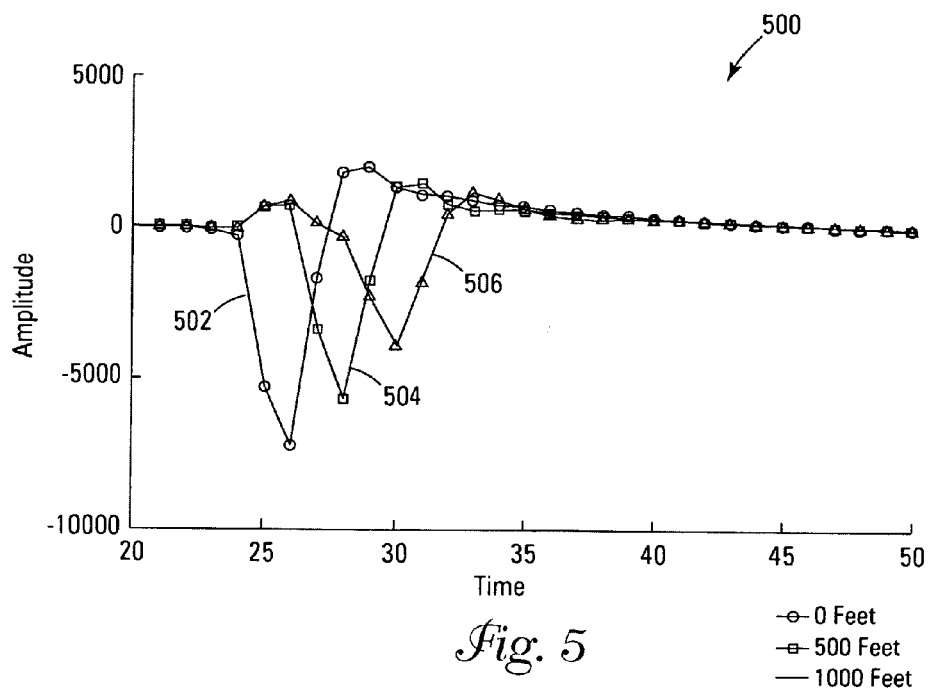
FIG. 5 is a chart showing exemplary echo responses of a hybrid circuit from one implementation of an HDSL2 line interface unit under various short-circuit faults.

FIGS. 4 and 5 illustrate the creation of one example of an echo canceller profile. FIG. 4 is a chart 400 showing exemplary echo responses of a hybrid circuit 318 from one implementation of an HDSL2 line interface unit 300 coupled to a telephone line 340 with open-circuit faults located at various distances from the hybrid circuit 318. Lines 402, 404, and 406 are echo responses of the hybrid circuit 318 when the telephone line 340 to which the HDSL2 line interface unit 300 is connected has an open-circuit fault located 0 feet, 500 feet, and 1000 feet, respectively, from the hybrid circuit 318. FIG. 5 is a chart 500 showing exemplary echo responses of a hybrid circuit 318 from one implementation of an HDSL2 line interface unit 300 coupled to a telephone line 340 with short-circuit faults located at various distances from the hybrid circuit 318. Lines 502, 504, and 506 are echo responses of the hybrid circuit 318 when the telephone line 340 to which the HDSL2 line interface unit 300 is connected has a short-circuit fault located 0 feet, 500 feet, and 1000 feet, respectively, from the hybrid circuit 318. Echo coefficients corresponding to each of the echo responses shown in FIGS. 4 and 5 are determined by the echo canceller 316 included in the HDSL2 line interface unit 300. The resulting echo coefficients are included in the echo canceller profile.

In this embodiment, the first set of information indicative of echo associated with the analyzed line and the second set of information indicative of echo associated with the analyzed line are correlated by correlating the set of first echo canceller coefficients with at least one of the sets of profile echo canceller coefficients included in the echo canceller profile. For example, in one embodiment, a normalized covariance correlation is performed. For each normalized covariance correlation that is performed, a correlation coefficient is generated. Other ways of correlating the set of first echo canceller coefficients with at least one of the sets of profile echo canceller coefficients included in the echo canceller profile can be used. In one implementation, the programmable processor 324 of the controller 322 is programmed to perform the correlation. In other implementations, a computer or other device is coupled to the line card 300 (for example, via the craft interface 332 or via an embedded operations channel). The computer or other device then performs the correlation.

Then, the analyzed fault is characterized based on the correlation between the set of first echo canceller coefficients and at least one of the sets of profile echo canceller coefficients included in the echo canceller profile. For example, in one implementation, it is determined if there is a high correlation between the set of first echo canceller coefficients and at least one of the sets of profile echo canceller coefficients included in the echo canceller profile. If there is, a determination is made that the analyzed fault has an attribute associated with the set of profile echo canceller coefficients with which the set of first echo canceller coefficients is highly correlated. Moreover, if there is not a high correlation between the set of first echo canceller coefficients and at least one of the sets of echo canceller coefficients included in the echo canceller profile, a determination is made that the analyzed fault does not have an attribute associated with the sets of profile echo canceller coefficients included in the echo canceller profile. It is to be understood, however, that in other implementations, if there is not a high correlation between the set of first echo canceller coefficients and at least one of the sets of profile echo canceller coefficients included in the echo canceller profile, no determination is made and additional techniques are used to analyze the analyzed fault, if desired.

Figure 6:
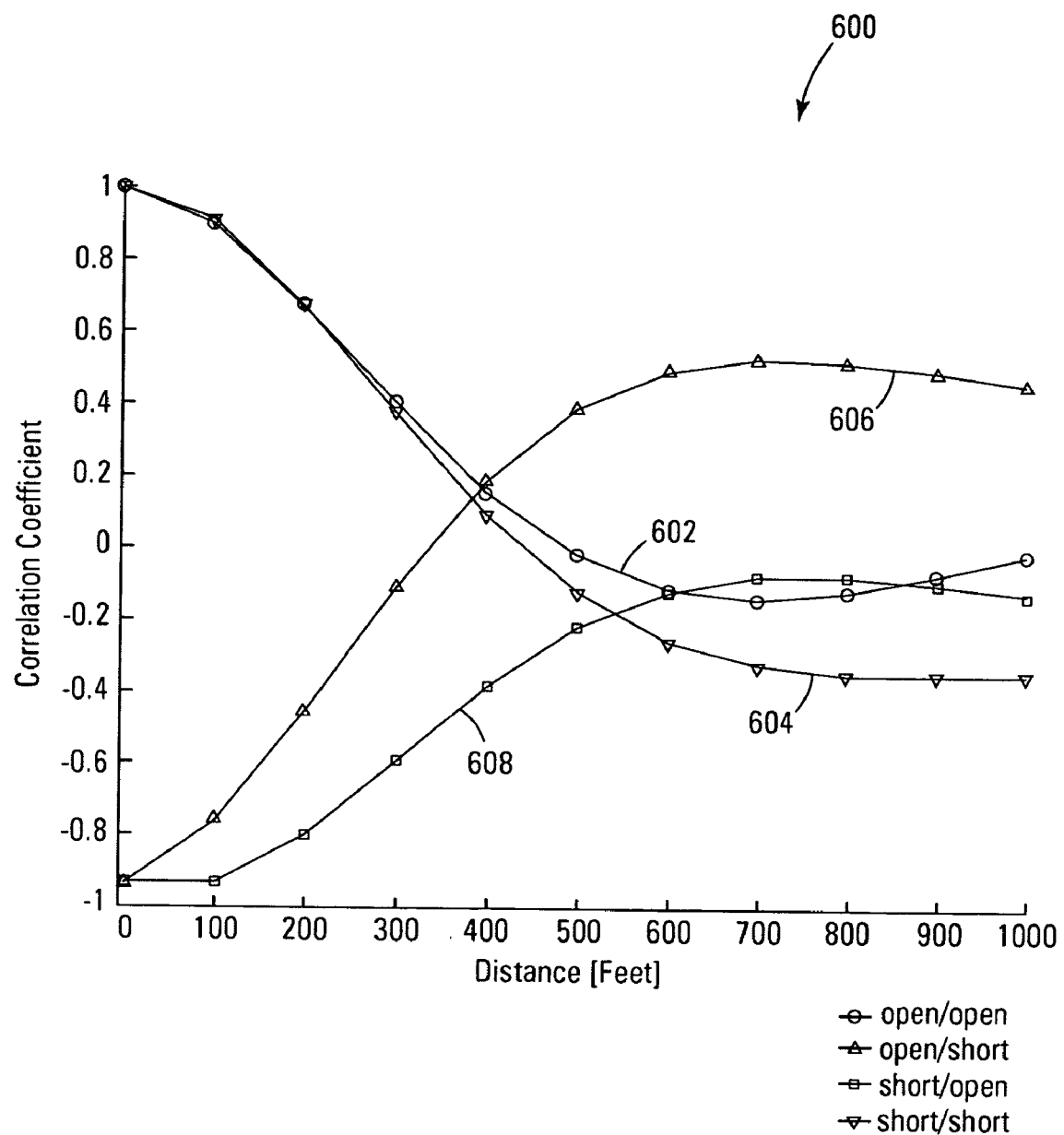
FIG. 6 is a chart showing exemplary correlation coefficients between echo responses generated by an echo canceller from one embodiment of an HDSL2 line card with various echo canceller coefficients associated with faults located at various distances from a hybrid circuit.

The determination as to whether there is a high correlation between the set of first echo canceller coefficients and at least one of the sets of profile echo canceller coefficients included in the echo canceller profile, in one implementation, is made by comparing a correlation coefficient to a threshold correlation value. FIG. 6 is a chart showing exemplary correlation coefficients between echo responses generated by an echo canceller 316 from one embodiment of an HDSL2 line card 300 with various echo canceller coefficients associated with faults located at various distances from a hybrid circuit 318. Line 602 shows the correlation coefficients resulting from correlating a 0 feet, open-circuit echo response (line 402 in FIG. 4) with the 0 feet (line 402 in FIG. 4), 100 feet (not shown in FIG. 4), 200 feet (not shown in FIG. 4), 300 feet (not shown in FIG. 4), 400 feet (not shown in FIG. 4), 500 feet (line 404 in FIG. 4), 600 feet (not shown in FIG. 4), 700 feet (not shown in FIG. 4), 800 feet (not shown in FIG. 4), 900 feet (not shown in FIG. 4), and 1000 feet (line 406 in FIG. 4) open-circuit echo responses. Line 604 shows the correlation coefficients resulting from correlating the 0 feet, short-circuit echo response (line 502 in FIG. 5) and the 0 feet (line 502 in FIG. 5), 100 feet (not shown in FIG. 5), 200 feet (not shown in FIG. 5), 300 feet (not shown in FIG. 5), 400 feet (not shown in FIG. 5), 500 feet (line 504 in FIG. 5), 600 feet (not shown in FIG. 5), 700 feet (not shown in FIG. 5), 800 feet (not shown in FIG. 5), 900 feet (not shown in FIG. 5), and 1000 feet (line 506 in FIG. 5) short-circuit echo responses. Line 606 shows the cross-correlation coefficients resulting from correlating the 0 feet, open-circuit echo response (line 402 in FIG. 4) and the 0 feet (line 502 in FIG. 5), 100 feet (not shown in FIG. 5), 200 feet (not shown in FIG. 5), 300 feet (not shown in FIG. 5), 400 feet (not shown in FIG. 5), 500 feet (line 504 in FIG. 5), 600 feet (not shown in FIG. 5), 700 feet (not shown in FIG. 5), 800 feet (not shown in FIG. 5), 900 feet (not shown in FIG. 5), and 1000 feet (line 506 in FIG. 5) short-circuit echo responses. Line 608 shows the cross-correlation coefficients resulting from correlating the 0 feet, short-circuit echo response (line 502 in FIG. 5) and the 0 feet (line 402 in FIG. 4), 100 feet (not shown in FIG. 4), 200 feet (not shown in FIG. 4), 300 feet (not shown in FIG. 4), 400 feet (not shown in FIG. 4), 500 feet (line 404 in FIG. 4), 600 feet (not shown in FIG. 4), 700 feet (not shown in FIG. 4), 800 feet (not shown in FIG. 4), 900 feet (not shown in FIG. 4), and 1000 feet (line 406 in FIG. 4) open-circuit echo responses.

Based on FIG. 6, a threshold correlation value of around 0.9 can be used to determine if a first set of echo canceller coefficients is highly correlated with echo canceller coefficients associated with line 402 from FIG. 4 (that is, echo canceller coefficients associated with an open-circuit fault located 0 feet from a hybrid circuit 318). Also, a threshold correlation value of around 0.9 can be used to determine if a first set of echo canceller coefficients is highly correlated with echo canceller coefficients associated with line 502 from FIG. 5 (that is, echo canceller coefficients associated with an short-circuit fault located 0 feet from a hybrid circuit 318).

In one implementation of this embodiment, the programmable processor 324 is programmed in a suitable manner to carry out the processing of method 200. The programmable processor 324 is programmed by storing appropriate program instructions in memory 326. The program instructions are retrieved from memory 326 and executed on programmable processor 324. The program instructions are operable to cause the programmable processor 324 to carry out the processing of method 200. In other implementations, a computer or other device is coupled to the line card 300 (for example, via the craft interface 332 or via an embedded operations channel). The computer or other device then performs all or a portion of the processing of method 200.

Figure 7A:
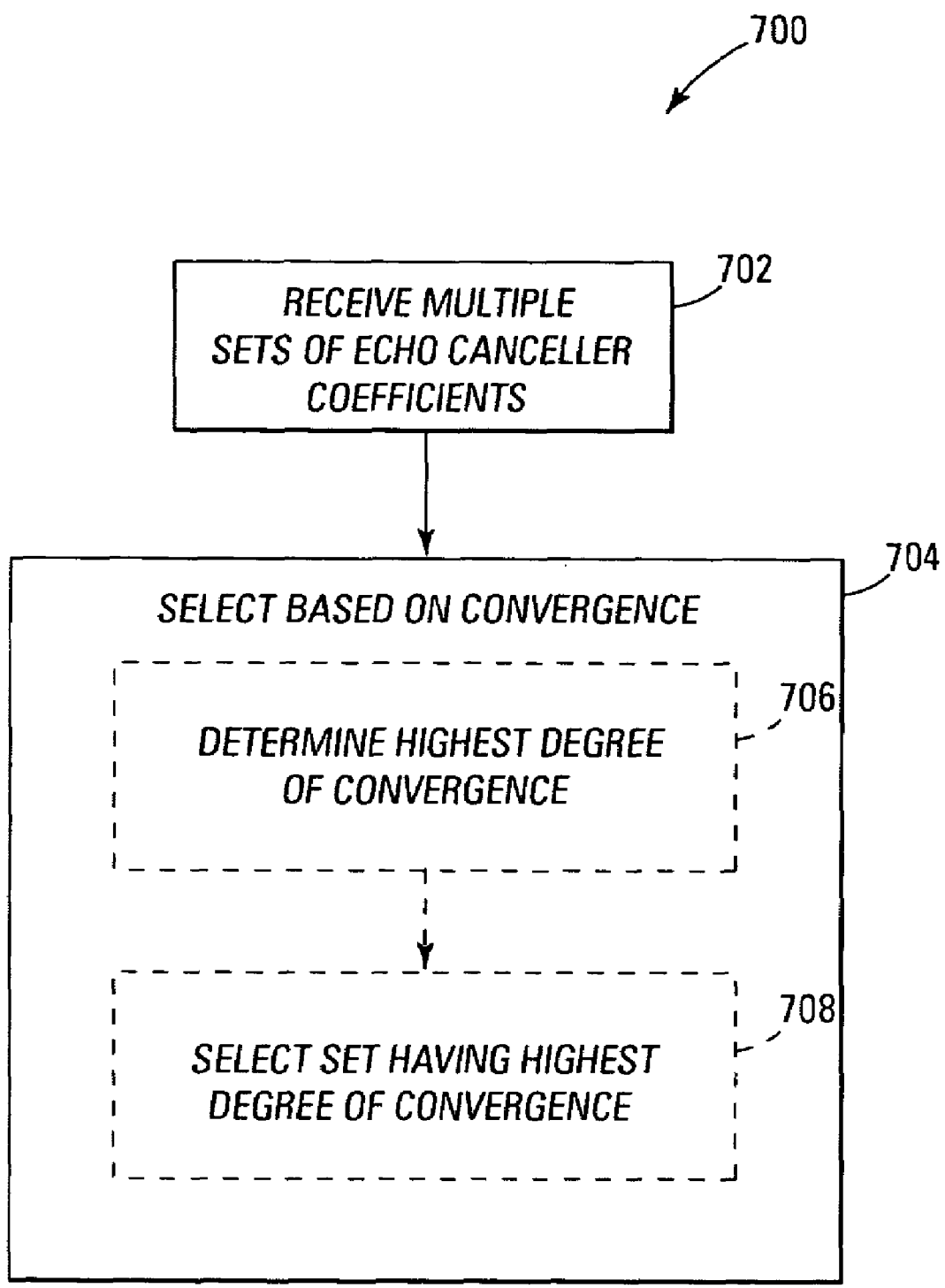
FIG. 7A is a flow diagram of an embodiment of a method of receiving a second set of information indicative of echo.

FIG. 7A is a flow diagram of one embodiment of a method 700 of receiving a first set of information indicative of echo. This embodiment is implemented using an echo canceller coupled to the analyzed communication medium. Method 700 includes receiving multiple sets of echo canceller coefficients from an echo canceller coupled to the analyzed communication medium (block 702). In this embodiment of method 700, the convergence process of the echo canceller is performed multiple times with the analyzed fault existing in the analyzed communication medium. Each time the convergence process is performed a different set of echo canceller coefficients is generated. Each set of echo canceller coefficients includes information indicative of the degree of convergence achieved by the echo canceller in generating that set of echo canceller coefficients. In one implementation of this embodiment, each set of echo canceller coefficients received from the echo canceller includes a received level that indicates the degree of convergence that was reached for that set of echo canceller coefficients. In one such implementation, the received level has a value ranging, for example, from a value of 127 to a value of 1000 or higher, where a lower value represents a higher degree of convergence. In one such implementation, the process is repeated three times to generate three sets of echo canceller coefficients, each set having an associated received level value.

Method 700 also includes selecting at least one of the multiple sets of echo canceller coefficients based on the degree of convergence achieved by each of the multiple sets of echo canceller coefficients (block 704). The selected set of echo canceller coefficients is then used as the first set of information indicative of echo in subsequent processing, for example, as described above in connection with method 200. In one implementation shown in FIG. 7 using dashed lines, selecting at least one of the multiple sets of echo canceller coefficients based on the degree of convergence achieved by each of the multiple sets of echo canceller coefficients includes determining for which set of echo canceller coefficients the echo canceller achieved the highest degree of convergence (block 706) and the set of echo canceller coefficients having the highest degree of convergence is selected (block 708) and is used for subsequent processing as the first set of information indicative of echo, for example, as described above in connection with embodiments of method 200.

Figure 7B:
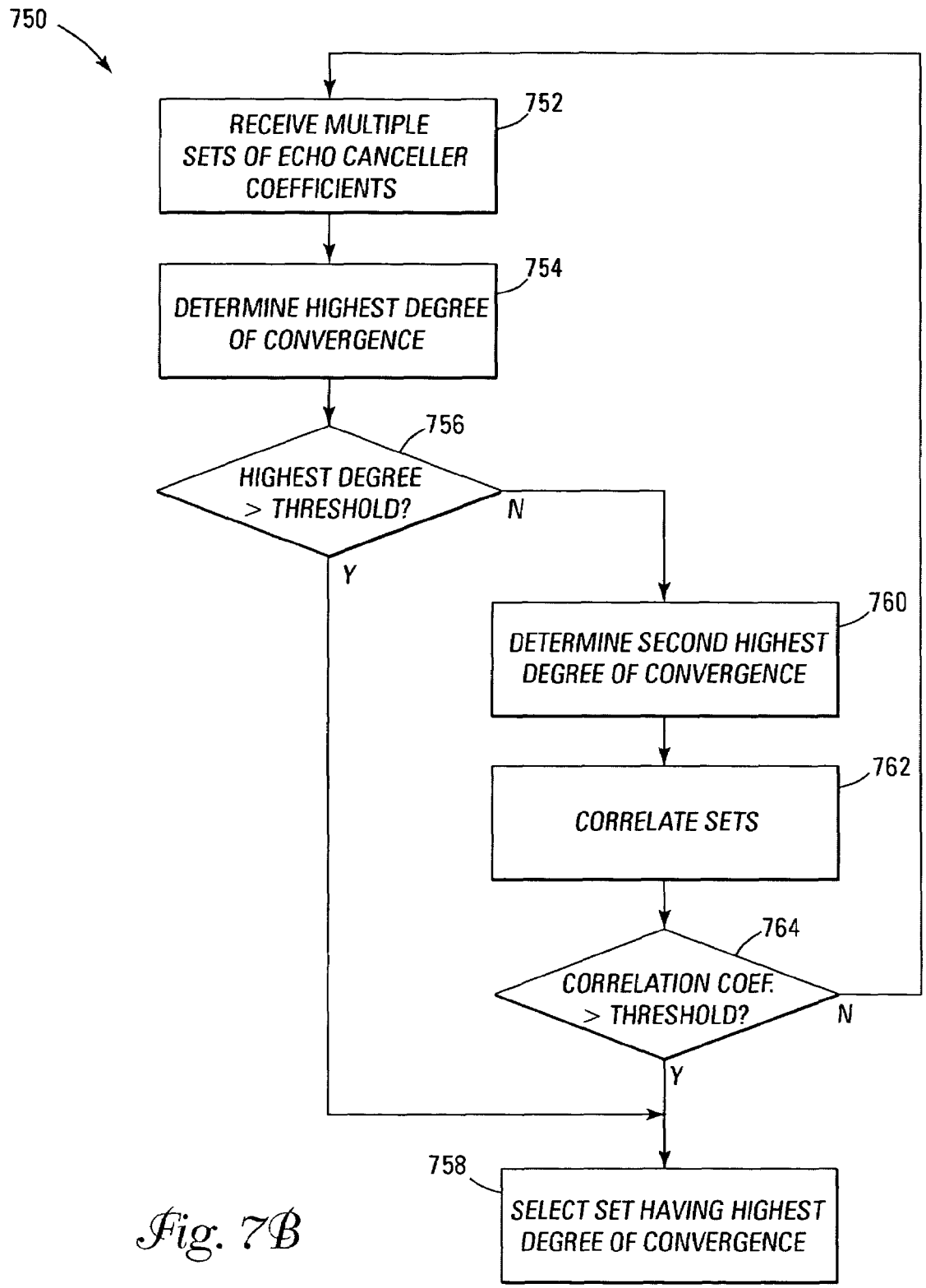
FIG. 7B is a flow diagram of an embodiment of a method of receiving a second set of information indicative of echo.

FIG. 7B is a flow diagram of one embodiment of a method 750 of receiving a first set of information indicative of echo. In the embodiment of method 750 shown in FIG. 7B, selecting at least one of the multiple sets of echo canceller coefficients based on the degree of convergence includes additional processing to determine if the set of echo canceller coefficients that has the highest degree of convergence is suitable for use in characterizing the analyzed fault. For example, it may be the case that the echo canceller, in some situations, is unable to achieve a degree of convergence that is desirable for reliable fault characterization. Such additional processing is intended to identify such situations. Moreover, it may be the case that even though a high degree of convergence is not achieved, the resulting echo canceller coefficients may nevertheless be suitable for use in the fault characterization process. For example, in one implementation of such an embodiment, if the set of echo canceller coefficients having the highest degree of convergence and the set of echo canceller coefficients having the second highest degree of convergence are highly correlated, the set of echo canceller coefficients having the highest degree of convergence is likely to be suitable for fault characterization.

Method 750 includes receiving multiple sets of echo canceller coefficients from an echo canceller coupled to the analyzed medium (block 752) and determining for which set of echo canceller coefficients the echo canceller achieved the highest degree of convergence (block 754) as described above in connection with method 700. If the highest degree of convergence achieved by the echo canceller is greater than (or greater than or equal to) a convergence threshold value (checked in block 756), then the set of echo canceller coefficients having the highest degree of convergence is selected (block 758) and is used as the first set of information indicative of echo for subsequent processing as described above.

If the highest degree of convergence achieved by the echo canceller is less than (or less than or equal to) the convergence threshold value, then it is determined for which set of echo canceller coefficients the echo canceller achieved the second highest degree of convergence (block 760). Then, the set of echo canceller coefficients having the highest degree of convergence and the set of echo canceller coefficients having the second highest degree of convergence are correlated (block 762). For example, in one implementation, this correlation is performed in the same way in which the first and second sets of information indicative of echo are correlated (for example, by executing the same or similar software or firmware routines). If the correlation between the set of echo canceller coefficients having the highest degree of convergence and the set of echo canceller coefficients having the second highest degree of convergence is greater than (or greater than or equal to) a threshold correlation value (checked in block 764), then the set of echo canceller coefficients having the highest degree of convergence is selected (block 764) and is used as the first set of information indicative of echo for subsequent processing as described above. For example, in one implementation, the threshold correlation value is the same as the threshold correlation value used in embodiments of method 200. If the correlation between the set of echo canceller coefficients having the highest degree of convergence and the set of echo canceller coefficients having the second highest degree of convergence is less than (or less than or equal to) the threshold correlation value, then additional echo canceller coefficients are obtained and method 700 is repeated (looping back to block 702). It is to be understood, however, that in other embodiments other processing occurs in the event that the correlation is not greater than the threshold correlation value, for example, generating an alarm or other error indication.

By receiving multiple sets of echo canceller coefficients and selecting the set having the highest degree of convergence for use as the first set of information indicative of echo, the accuracy of the fault characterization process can be improved. Also, the accuracy of the fault characterization process, in some embodiments, can be improved by performing additional processing to determine if the set of echo canceller coefficients having the highest degree of convergence is suitable for use in characterizing the fault. Such embodiments may be used where the echo canceller frequently does not achieve a degree of convergence that is desirable for reliable fault characterization.

Figure 8A:
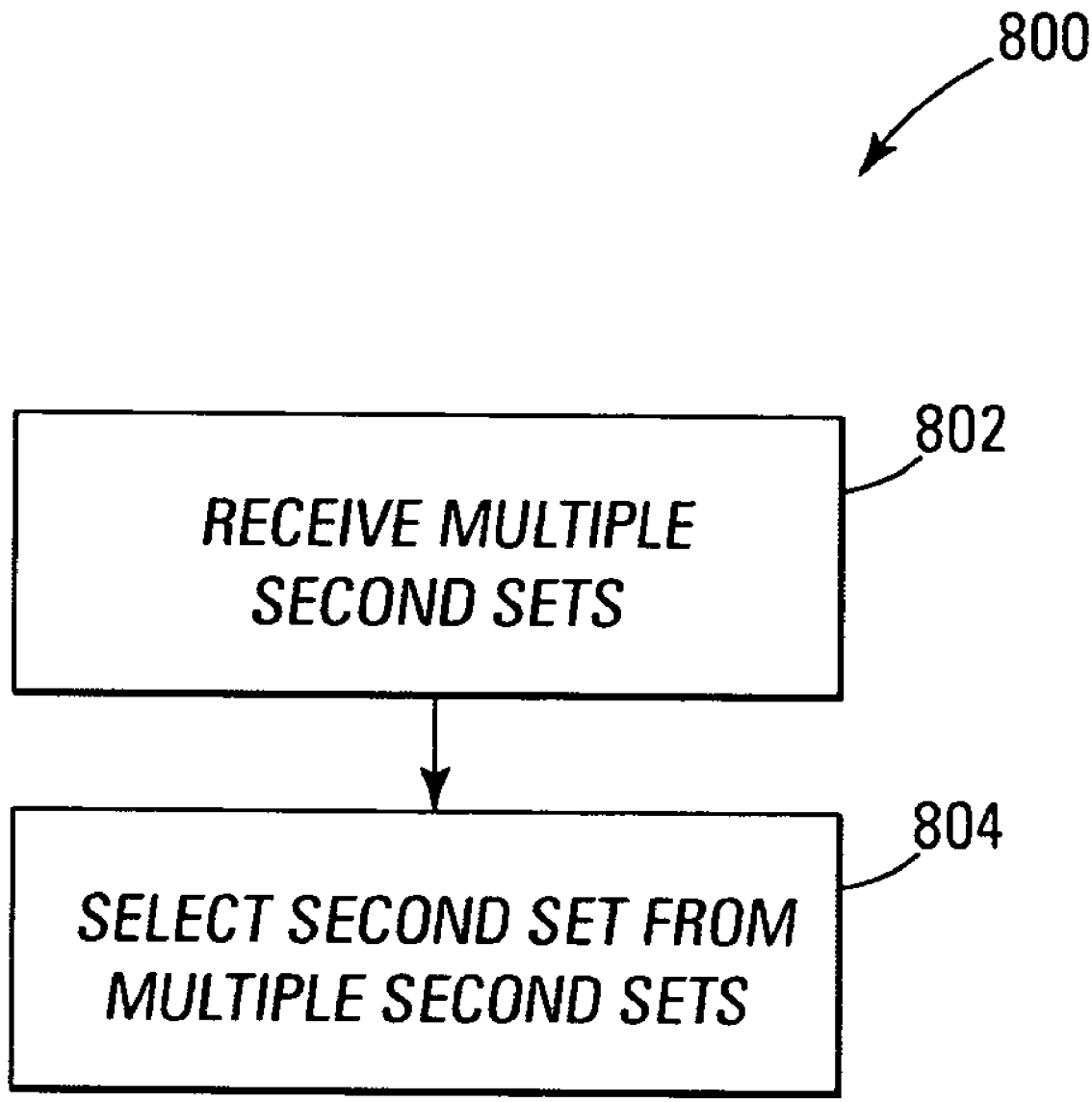
FIG. 8A is a flow diagram of an embodiment of a method of receiving a first set of information indicative of echo.

FIG. 8 is a flow diagram of one embodiment of a method 800 of receiving a second set of information indicative of echo. Embodiments of method 800 are suitable for use with embodiments of methods 200, 700, 750, and 900. Method 800 includes receiving multiple second sets of information indicative of echo (block 802) and selecting a second set of information indicative of echo from the multiple second sets (block 804). The selected second set of information indicative of echo is used for subsequent processing (for example, as described above in connection with embodiments of method 200).

Figure 8B:
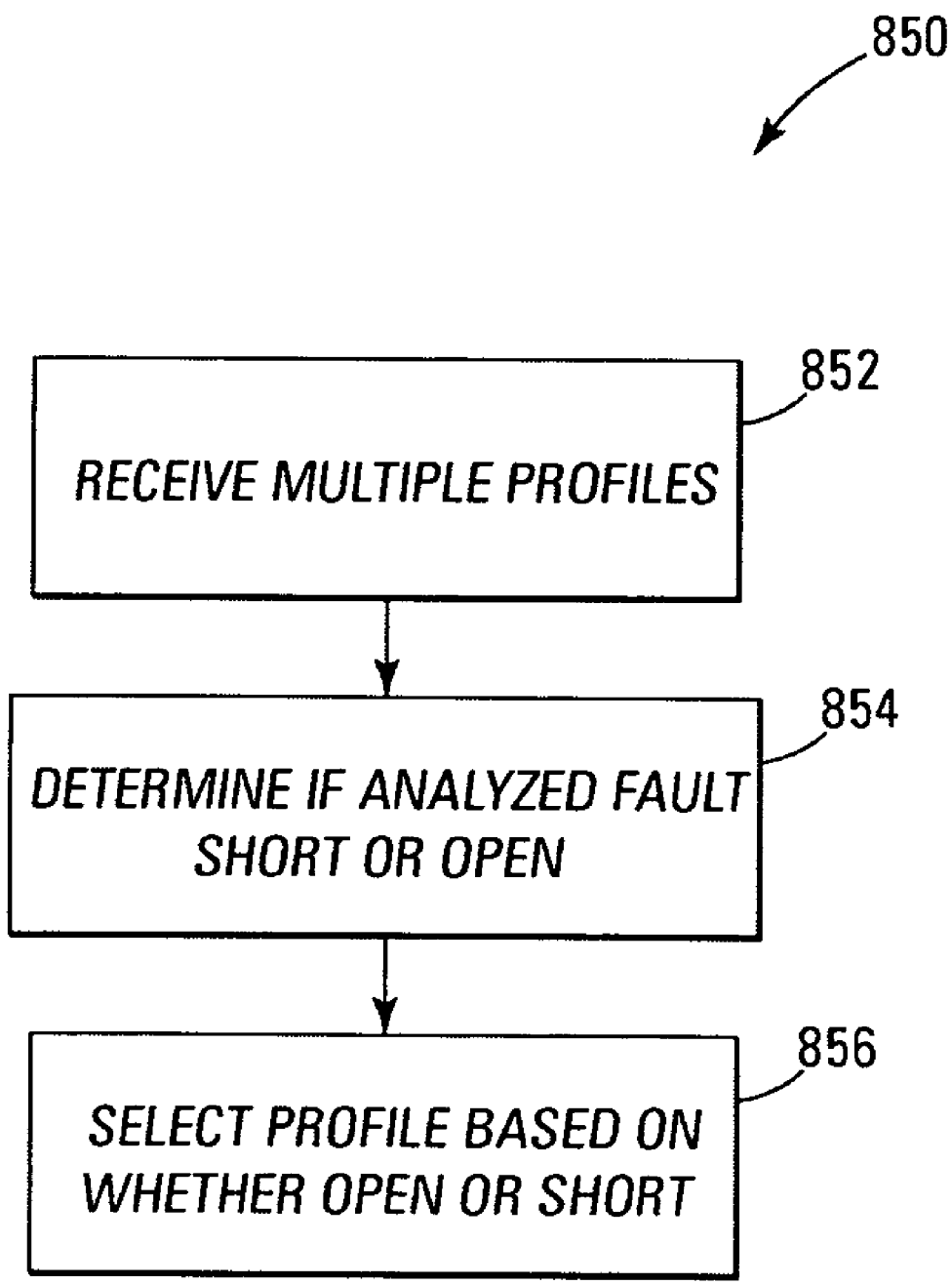
FIG. 8B is a flow diagram of an embodiment of a method of receiving a first set of information indicative of echo.

In one embodiment of method 800, each of the multiple sets of information is associated with one type of fault. The second set of information indicative of echo is selected, in such an embodiment, based on the fault type. For example, method 850 is one exemplary embodiment of method 800 and is shown in FIG. 8B. Implementations of method 850 are suitable for use with embodiments of the line interface unit 300 of FIG. 3. At least two echo canceller profiles are used in method 850. One echo canceller profile includes multiple sets of profile echo canceller coefficients, where each set of profile echo canceller coefficients is associated with a first type of fault (for example, a short circuit) located at one of multiple locations in a telephone line (for example, every 100 feet). The other echo canceller profile includes multiple sets of profile echo canceller coefficients, where each set of echo canceller coefficients is associated with a second fault type (for example, an open circuit) located at one of multiple locations in a telephone line (for example, every 100 feet). The echo canceller profiles in such an embodiment are generated, for example, in one of the ways described above.

Method 850 includes receiving multiple sets of echo canceller profiles (block 852). Method 850 further includes determining if the analyzed fault is a short circuit or an open circuit fault (block 854). In one such implementation, this determination is made by performing a current test using functionality included in the power supply of a line interface unit. For example, in the embodiment of line interface unit 300 shown in FIG. 3, power supply 321 includes a current sensor 321. A current test is performed by applying a predetermined voltage (for example, 180 volts) to the analyzed line and measuring the current in the analyzed line using the current sensor 321. If the measured current is less than a first threshold current value, an undercurrent condition exists and the analyzed fault is considered to be an open circuit fault. If the measured current is greater than a second threshold current value, an overcurrent condition exists and the analyzed fault is considered to be a short circuit fault.

Method 850 also includes selecting an echo canceller profile based on whether the analyzed fault is a short circuit fault or an open circuit fault (block 856). For example, in one implementation, if it is determined that the analyzed fault is a short-circuit fault, then the echo canceller profile associated with the short-circuit fault type is selected. If it is determined that the analyzed fault is an open-circuit fault, then the echo canceller profile associated with the open-circuit fault type is selected. The selected echo canceller profile is then used as the second set of information indicative of echo for subsequent processing as described above.

In embodiments of methods 800 and 850, the number of correlations between the first set of information indicative of echo and various items included in the second set of information indicative echo that are performed can be reduced. For example, in embodiments where two echo canceller profiles are used, one of the echo canceller profiles is used for subsequent correlation processing (that is, one or more of the sets of profile echo canceller coefficients included in the selected echo canceller profile is correlated with a first set of echo canceller coefficients), and no correlation processing need be performed on the non-selected echo canceller profile. This can reduce the amount of resources needed to perform the fault characterization processing and/or reduce the amount of time needed to perform such processing. Moreover, this can improve the accuracy with which the analyzed is characterized. For example, in those situations where it is more difficult to distinguish between open circuit and short circuit conditions at certain fault locations (for example, where the analyzed fault is relatively far from the hybrid circuit or other telecommunications device), the accuracy with which an analyzed fault is characterized can be improved with such embodiments of methods 800 and 850.

Figure 9:
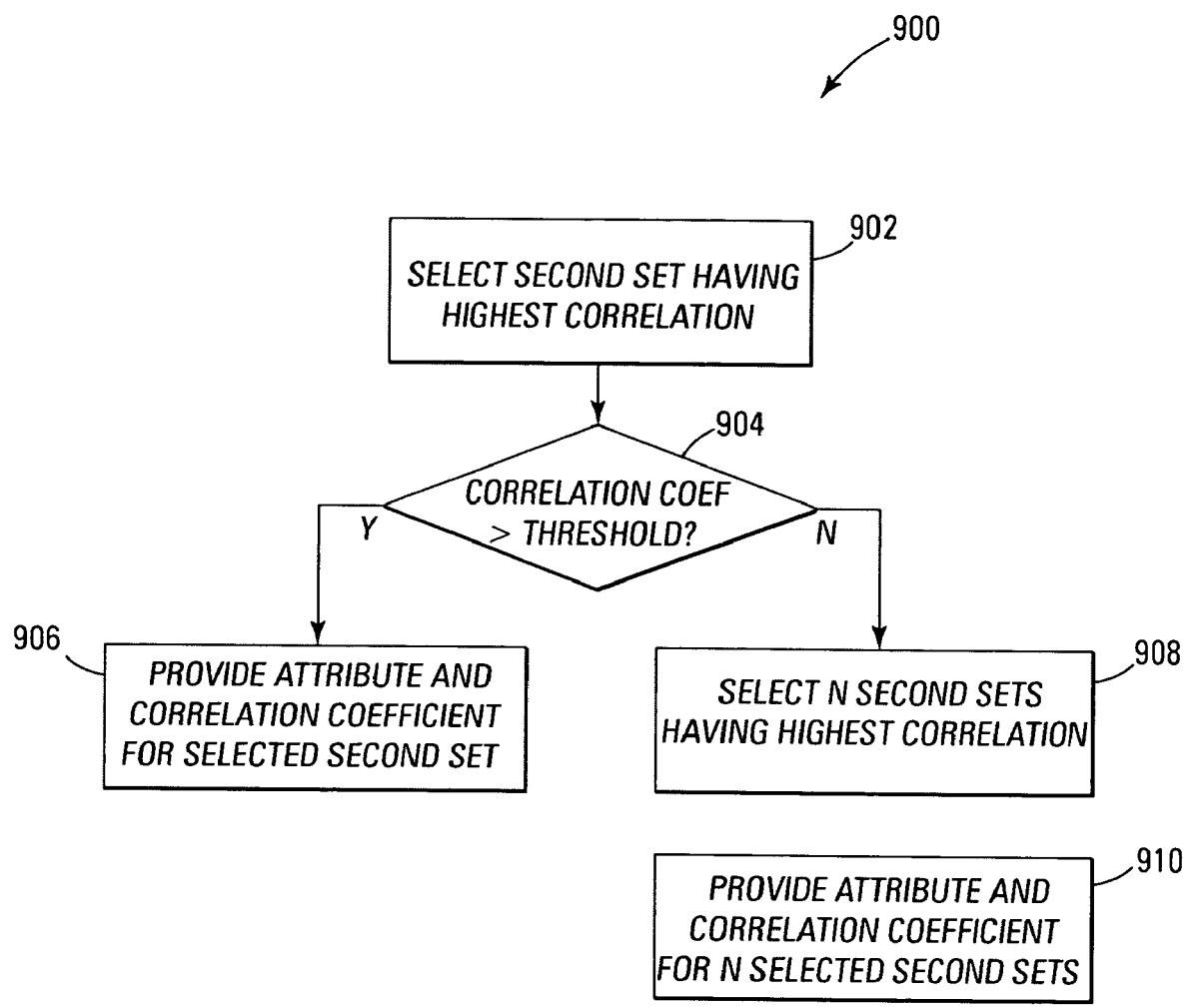
FIG. 9 is a flow diagram of one embodiment of a method of characterizing a fault based on a correlation between first and second sets of information indicative of echo.

FIG. 9 is a flow diagram of one embodiment of a method 900 of characterizing a fault based on a correlation between first and second sets of information indicative of echo. Method 900 is used in embodiments of method 200 where the first set of information indicative of echo includes a first set of echo canceller coefficients and the second set of information indicative of echo includes multiple second sets of echo canceller coefficients. In such embodiments, the first set of echo canceller coefficients is correlated with each of the multiple second sets of echo canceller coefficients to generate a correlation coefficient for that second set of echo canceller coefficients.

Method 900 includes selecting the second set of echo canceller coefficients having the highest correlation with the first set of echo canceller coefficients (block 902). For example, in one implementation, this is done by selecting the second set of echo canceller coefficients having the highest correlation coefficient with the first set of echo canceller coefficients. Method 900 also includes determining if the correlation coefficient associated with selected second set is greater than (or greater than or equal to) a threshold correlation value (block 904). If the correlation coefficient associated with the selected second set is greater than (or greater than or equal to) the threshold correlation value, method 900 provides one or more attributes associated with the selected second set of echo canceller coefficients along with the correlation coefficient (block 906). For example, in one implementation implemented using an embodiment of the HDSL line interface unit 300 of FIG. 3, the one or more attributes associated with the selected second set and the correlation coefficient for the selected second set are communicated to a terminal attached to the craft port of the line interface unit or to a management system executing on a management card coupled to the line interface unit, for example, via a system backplane. In such an implementation, the one or more attributes that are communicated include the type of fault (for example, a short circuit or an open circuit) and the location of the fault (for example, 500 feet from a hybrid circuit coupled to the analyzed line) associated with the selected second set, along with the correlation coefficient for the selected second set.

If the correlation coefficient associated with the selected second set of echo canceller coefficients is less than (or less than or equal to) the threshold correlation value, method 900 selects the N second sets of echo canceller coefficients having the N highest correlations with the first set of echo canceller coefficients, where N is greater than one (block 908). One or more attributes associated with the N selected second sets, along with the correlation coefficients associated with the selected second sets, are provided (block 910). In one implementation of such an embodiment, N is equal to four (4) and the four second sets of echo canceller coefficients having the four highest correlation coefficients are selected. In one implementation of such an embodiment using an embodiment of the HDSL line interface unit 300 of FIG. 3, the type and location of the known fault associated with each of the four selected second are provided along with the correlation coefficients for each of the selected second sets. Such an approach allows the system to which this information is provided to perform additional fault analysis. For example, in one implementation, the additional fault analysis includes selecting the attributes associated with one of the N selected second sets based on additional data not available to the device used to implement method 900.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method of analyzing an analyzed fault associated with an analyzed communication medium, comprising:
   receiving a plurality of sets of first echo canceller coefficients from an echo canceller, each of the plurality of sets of first echo canceller coefficients having an associated degree of convergence;
   selecting one of the plurality of sets of first echo canceller coefficients based on the degree of convergence associated with each of the plurality of sets of first echo canceller coefficients;
   receiving an echo canceller profile, wherein the echo canceller profile includes at least one set of profile echo canceller coefficients;
   correlating the selected set of first echo canceller coefficients with at least one of the sets of profile echo canceller coefficients included in the echo canceller profile; and
   characterizing the analyzed fault based on the correlation between the selected set of first echo canceller coefficients and the at least one of the sets of profile echo canceller coefficients included in the echo canceller profile.

2. The method of claim 1, wherein the selected set of first echo canceller coefficients is selected by selecting the set of first echo canceller coefficients having the highest degree of convergence.

3. The method of claim 2, wherein selecting one of the plurality of first echo canceller coefficients includes:
   determining which of the plurality of first echo canceller coefficients has the highest degree of convergence; and
   when the highest degree of convergence is greater than a threshold convergence value, selecting the set of first echo canceller coefficients having the highest degree of convergence.

4. The method of claim 3, further comprising, when the highest degree of convergence is less than the threshold convergence value:
   determining which of the plurality of first echo canceller coefficients has the second highest degree of convergence; and
   correlating the set of first echo canceller coefficients having the highest degree of convergence with the set of first echo canceller coefficients having the second highest degree of convergence in order to create a correlation coefficient; and
   when the correlation coefficient is greater than a threshold correlation value, selecting the set of first echo canceller coefficients having the highest degree of convergence.

5. The method of claim 1, wherein characterizing the analyzed fault includes:
   determining if there is a first correlation between the selected set of first echo canceller coefficients and at least one of the sets of profile echo canceller coefficients included in the echo canceller profile; and
   when there is the first correlation between the selected set of first echo canceller coefficients and at least one of the sets of profile echo canceller coefficients included in the echo canceller profile, determining that the analyzed fault has an attribute associated with the at least one set of profile echo canceller coefficients included in the echo canceller profile with which the selected set of first echo canceller coefficients has the first correlation.

6. The method of claim 5, wherein the attribute is a type of a known fault associated with the at least one set of profile echo canceller coefficients included in the echo canceller profile with which the selected set of first echo canceller coefficients has the first correlation.

7. The method of claim 5, wherein the attribute is a location of a known fault associated with the at least one set of profile echo canceller coefficients included in the echo canceller profile with which the selected set of first echo canceller coefficients has the first correlation.

8. The method of claim 5, wherein the first correlation is a high correlation.

9. The method of claim 1, wherein the echo canceller profile includes at least one set of profile echo canceller coefficients associated with a communication medium having a plurality of sections, each section having at least one medium attribute.

10. The method of claim 9, wherein the medium attribute is a gauge.

11. The method of claim 9, wherein the medium attribute of at least one of the plurality of sections is different from the medium attribute of at least one of the other sections.

12. The method of claim 11, wherein the echo canceller profile includes at least one set of profile echo canceller coefficients associated with a telephone line having a 1000 foot section of 24 AWG wire and an 8000 foot section of 26 AWG wire.

13. The method of claim 1, further comprising generating the echo canceller profile.

14. The method of claim 13, wherein the echo canceller profile is generated using a second communication medium that is configured to model an expected operating environment.

15. The method of claim 13, wherein the echo canceller profile is generated during a manufacturing process.

16. The method of claim 13, wherein the echo canceller profile is generated during an installation process.

17. The method of claim 13, wherein generating the echo canceller profile includes updating the echo canceller profile during normal operation.

18. A method of analyzing an analyzed fault associated with an analyzed communication medium, comprising:
receiving a plurality of second sets of information indicative of echo;
selecting one of the second sets of information indicative of echo;
correlating a first set of information indicative of echo associated with the analyzed communication medium with the selected second set; and
characterizing the analyzed fault based on the correlation between the first set and the selected second set.

19. The method of claim 18, wherein the first set of information indicative of echo includes a set of first echo canceller coefficients and each of the second sets of information indicative of echo includes an echo canceller profile, wherein each echo canceller profile includes at least one set of profile echo canceller coefficients.

20. The method of claim 19, further comprising determining a first attribute associated with the analyzed fault, wherein selecting one of the second sets of information indicative of echo includes selecting one of the plurality of echo canceller profiles based on the attribute.

21. The method of claim 20, wherein the first attribute includes a fault type associated with the analyzed fault.

22. The method of claim 20, wherein characterizing the analyzed fault includes:
determining if there is a first correlation between the set of first echo canceller coefficients and at least one of the sets of profile echo canceller coefficients included in the selected echo canceller profile; and
when there is the first correlation between the set of first echo canceller coefficients and at least one of the sets of profile echo canceller coefficients included in the selected echo canceller profile, determining that the analyzed fault has a second attribute associated with the at least one set of profile echo canceller coefficients included in the selected echo canceller profile with which the set of first echo canceller coefficients has the first correlation.

23. The method of claim 22, wherein the second attribute is a location of a known fault associated with the at least one set of profile echo canceller coefficients included in the selected echo canceller profile with which the set of first echo canceller coefficients has the first correlation.

24. The method of claim 22, wherein the first correlation is a high correlation.

25. The method of claim 19, wherein at least one echo canceller profile is generated using a second communication medium that is configured to model an expected operating environment.

26. The method of claim 19, wherein at least one echo canceller profile includes at least one set of profile echo canceller coefficients associated with a communication medium having a plurality of sections, each section having at least one medium attribute.

27. The method of claim 26, wherein the medium attribute is a gauge.

28. The method of claim 26, wherein the medium attribute of at least one of the plurality of sections is different from the medium attribute of at least one of the other sections.

29. The method of claim 28, wherein the at least one echo canceller profile includes a set of profile echo canceller coefficients associated with a telephone line having a 1000 foot section of 24 AWG wire and an 8000 foot section of 26 AWG wire.

30. The method of claim 19, further comprising generating the plurality of echo canceller profiles.

31. The method of claim 30, wherein the plurality of echo canceller profiles is generated during a manufacturing process.

32. The method of claim 30, wherein the plurality of echo canceller profiles is generated during an installation process.

33. The method of claim 30, wherein generating the plurality of echo canceller profiles include updating at least one of the echo canceller profiles during normal operation.

34. A method of analyzing an analyzed fault associated with an analyzed communication medium, comprising:
receiving an echo canceller profile, wherein the echo canceller profile includes a plurality of sets of profile echo canceller coefficients;
correlating a set of first echo canceller coefficients received from an echo canceller with at least a subset of the plurality of sets of profile echo canceller coefficients included in the echo canceller profile to create a correlation coefficient for each set of the profile echo canceller coefficients included in the subset; and
characterizing the analyzed fault based on the correlations between the set of first echo canceller coefficients and the subset of the plurality of the sets of profile echo canceller coefficients included in the echo canceller profile, wherein characterizing the analyzed fault includes:
selecting the set of profile echo canceller coefficients having a highest correlation coefficient; and
when the highest correlation coefficient is greater than a threshold correlation value, providing a first attribute associated with the selected set of profile echo canceller coefficients.

35. The method of claim 34, wherein providing the first attribute associated with the selected set of profile echo canceller coefficients when the highest correlation coefficient is greater than the threshold correlation value includes providing the correlation coefficient associated with the selected set of profile echo canceller coefficients.

36. The method of claim 34, further comprising:
when the highest correlation coefficient is less than the threshold correlation value, selecting N sets of profile echo canceller coefficients having the N highest correlation coefficients, wherein N is a number greater than one; and
providing a second attribute associated with each of the N selected sets of profile echo canceller coefficients.

37. The method of claim 36, wherein providing the second attribute associated with the N selected sets of profile echo canceller coefficients when the correlation coefficient is less than the threshold correlation value includes providing the correlation coefficient associated with each of the N selected sets of profile echo canceller coefficients.

38. The method of claim 36, wherein the second attribute associated is a type of a fault associated with each of the N selected sets of profile echo canceller coefficients.

39. The method of claim 36, wherein the second attribute is a location of a fault associated with each of the N selected sets of profile echo canceller coefficients.

40. The method of claim 34, wherein the first attribute associated is a type of a fault associated with the selected set of profile echo canceller coefficients.

41. The method of claim 34, wherein the first attribute is a location of a fault associated with the selected set of profile echo canceller coefficients.

42. The method of claim 34, wherein the echo canceller profile includes at least one set of profile echo canceller coefficients associated with a communication medium having a plurality of sections, each section having at least one medium attribute.

43. The method of claim 42, wherein the medium attribute is a gauge.

44. The method of claim 42, wherein the medium attribute of at least one of the plurality of sections is different from the medium attribute of at least one of the other sections.

45. The method of claim 44, wherein the echo canceller profile includes at least one set of profile echo canceller coefficients associated with a telephone line having a 1000 foot section of 24 AWG wire and an 8000 foot section of 26 AWG wire.

46. The method of claim 34, further comprising generating the echo canceller profile.

47. The method of claim 46, wherein the echo canceller profile is generated using a second communication medium that is configured to model an expected operating environment.

48. The method of claim 46, wherein the echo canceller profile is generated during a manufacturing process.

49. The method of claim 46, wherein the echo canceller profile is generated during an installation process.

50. The method of claim 46, wherein generating the echo canceller profile includes updating the echo canceller profile during normal operation.

51. A line interface unit that analyzes an analyzed fault associated with an analyzed communication medium, the line interface unit comprising:
a first interface adapted to couple the line interface unit to a first communication link;
an echo canceller coupled to the first communication link; and
a controller, coupled to the echo canceller, adapted to:
receive a plurality of sets of first echo canceller coefficients from the echo canceller, each of the sets of first echo canceller coefficients has an associated degree of convergence;
select one of the plurality of sets of first echo canceller coefficients based on the degree of convergence associated with each of the plurality of sets of first echo canceller coefficients;
receive an echo canceller profile, wherein the echo canceller profile includes at least one set of profile echo canceller coefficients;
correlate the selected set of first echo canceller coefficients with at least one of the sets of profile echo canceller coefficients included in the echo canceller profile; and
characterize the fault based on the correlation between the selected set of first echo canceller coefficients and the at least one of the sets of profile echo canceller coefficients included in the echo canceller profile.

52. The line interface unit of claim 51, further comprising a second interface, coupled to the first interface, adapted to couple the line interface unit to a second communication link.

53. The line interface unit of claim 51, wherein the controller is further adapted, in order to select the selected set of first echo canceller coefficients, to select the set of first echo canceller coefficients having the highest degree of convergence.

54. The line interface unit of claim 53, wherein the controller is further adapted to:
determine which of the plurality of first echo canceller coefficients has the highest degree of convergence; and
when the highest degree of convergence is greater than a threshold convergence value, select the set of first echo canceller coefficients having the highest degree of convergence.

55. The line interface unit of claim 54, wherein the controller is further adapted to, when the highest degree of convergence is less than the threshold convergence value:
determine which of the plurality of first echo canceller coefficients has the second highest degree of convergence; and
correlate the set of first echo canceller coefficients having the highest degree of convergence with the set of first echo canceller coefficients having the second highest degree of convergence in order to create a correlation coefficient; and
when the correlation coefficient is greater than a threshold correlation value, select the set of first echo canceller coefficients having the highest degree of convergence.

56. The line interface unit of claim 51, wherein the controller is further adapted to:
determine if there is a first correlation between the selected set of first echo canceller coefficients and at least one of the sets of profile echo canceller coefficients included in the echo canceller profile; and
when there is the first correlation between the selected set of first echo canceller coefficients and at least one of the sets of profile echo canceller coefficients included in the echo canceller profile, determine that the analyzed fault has an attribute associated with the at least one set of profile echo canceller coefficients included in the echo canceller profile with which the selected set of first echo canceller coefficients has the first correlation.

57. The line interface unit 51, wherein the echo canceller profile is generated using a communication medium that is configured to model an expected operating environment.

58. The line interface unit of claim 51, wherein the echo canceller profile includes at least one set of profile echo canceller coefficients associated with a communication medium having a plurality of sections, each section having at least one medium attribute.

59. The line interface unit of claim 58, wherein the medium attribute is a gauge.

60. The line interface unit of claim 58, wherein the medium attribute of at least one of the plurality of sections is different from the medium attribute of at least one of the other sections.

61. The line interface unit claim 60, wherein the echo canceller profile includes at least one set of profile echo canceller coefficients associated with a telephone line having a 1000 foot section of 24 AWG wire and an 8000 foot section of 26 AWG wire.

62. The line interface unit of claim 51, wherein the first communication link includes at least one twisted-pair telephone line.

63. The line interface unit of claim 62, wherein the first interface is adapted to couple the line interface unit to the at least one twisted-pair telephone line.

64. The line interface unit of claim 63, wherein the first communication link is an HDSL2 link.

65. The line interface unit of claim 64, wherein the first interface includes an HDSL2 framer.

66. The line interface unit of claim 62, wherein the first interface includes a hybrid circuit, coupled to the echo canceller, that is adapted to couple the line interface unit to the at least one twisted-pair telephone line.

67. The line interface unit of claim 51, wherein the controller includes:
 a programmable processor coupled to the echo canceller;
 a memory coupled to the programmable processor, wherein program instructions are stored in the memory, the program instructions operable to cause the programmable processor to:
  receive the plurality of sets of first echo canceller coefficients from the echo canceller;
  select one of the plurality of sets of first echo canceller coefficients based on the degree of convergence associated with each of the plurality of sets of first echo canceller coefficients;
  receive the echo canceller profile;
  correlate the selected set of first echo canceller coefficients with the at least one of the sets of profile echo canceller coefficients included in the echo canceller profile; and
  characterize the analyzed fault based on the correlation between the selected set of first echo canceller coefficients and the at least one of the sets of profile echo canceller coefficients included in the echo canceller profile.

68. A line interface unit that analyzes an analyzed fault associated with an analyzed communication medium, the line interface unit comprising:
 a first interface adapted to couple the line interface unit to a first communication link;
 an echo canceller coupled to the first communication link; and
 a controller, coupled to the echo canceller, adapted to:
  receive a plurality of second sets of information indicative of echo;
  select one of the second sets of information indicative of echo;
  correlate a first set of information indicative of echo associated with the analyzed communication medium with the selected second set; and
  characterize the analyzed fault based on the correlation between the first set and the selected second set.

69. The line interface unit of claim 68, wherein the first set of information indicative of echo includes a set of first echo canceller coefficients and each of the second sets of information indicative of echo includes an echo canceller profile, wherein each echo canceller profile includes at least one set of profile echo canceller coefficients.

70. The line interface unit 69, wherein at least one echo canceller profile is generated using a communication medium that is configured to model an expected operating environment.

71. The line interface unit of claim 69, wherein at least one echo canceller profile includes at least one set of profile echo canceller coefficients associated with a communication medium having a plurality of sections, each section having at least one medium attribute.

72. The line interface unit of claim 71, wherein the medium attribute is a gauge.

73. The line interface unit of claim 71, wherein the medium attribute of at least one of the plurality of sections is different from the medium attribute of at least one of the other sections.

74. The line interface unit claim 73, wherein the at least one echo canceller profile includes a set of profile echo canceller coefficients associated with a telephone line having a 1000 foot section of 24 AWG wire and an 8000 foot section of 26 AWG wire.

75. The line interface unit of claim 69, further comprising a second interface, coupled to the first interface, adapted to couple the line interface unit to a second communication link.

76. The line interface unit of claim 69, wherein the controller is further adapted to determine a first attribute associated with the analyzed fault.

77. The line interface unit of claim 76, wherein the controller is further adapted, in order to select one of the second sets of information indicative of echo, to select one of the plurality of echo canceller profiles based on the first attribute.

78. The line interface unit of claim 76, wherein the first attribute includes a fault type associated with the analyzed fault.

79. The line interface unit of claim 77, wherein the controller is further adapted to:
 determine if there is a first correlation between the set of first echo canceller coefficients and at least one of the sets of profile echo canceller coefficients included in the selected echo canceller profile; and
 when there is the first correlation between the set of first echo canceller coefficients and at least one of the sets of profile echo canceller coefficients included in the selected echo canceller profile, determine that the analyzed fault has a second attribute associated with the at least one set of profile echo canceller coefficients included in the selected echo canceller profile with which the set of first echo canceller coefficients has the first correlation.

80. The line interface unit of claim 68, wherein the first communication link includes at least one twisted-pair telephone line.

81. The line interface unit of claim 80, wherein the first interface is adapted to couple the line interface unit to the at least one twisted-pair telephone line.

82. The line interface unit of claim 81, wherein the first communication link is an HDSL2 link.

83. The line interface unit of claim 82, wherein the first interface includes an HDSL2 framer.

84. The line interface unit of claim 80, wherein the first interface includes a hybrid circuit, coupled to the echo canceller, that is adapted to couple the line interface unit to the at least one twisted-pair telephone line.

85. The line interface unit of claim 68, wherein the controller includes:
a programmable processor coupled to the echo canceller;
a memory coupled to the programmable processor, wherein program instructions are stored in the memory, the program instructions operable to cause the programmable processor to:
receive a plurality of second sets of information indicative of echo;
select one of the second sets of information indicative of echo;
correlate a first set of information indicative of echo associated with the analyzed communication medium with the selected second set; and
characterize the analyzed fault based on the correlation between the first set and the selected second set.

86. A line interface unit that analyzes an analyzed fault associated with an analyzed communication medium, the line interface unit comprising:
a first interface adapted to couple the line interface unit to a first communication link;
an echo canceller coupled to the first communication link;
a controller, coupled to the echo canceller, adapted to:
receive an echo canceller profile, wherein the echo canceller profile includes a plurality of sets of profile echo canceller coefficients;
correlate a set of first echo canceller coefficients received from an echo canceller with at least a subset of the plurality of sets of profile echo canceller coefficients included in the echo canceller profile to create a correlation coefficient for each set of the profile echo canceller coefficients included in the subset; and
characterize the analyzed fault based on the correlations between the set of first echo canceller coefficients and the subset of the plurality of the sets of profile echo canceller coefficients included in the echo canceller profile; and
wherein the controller is further adapted, in order to characterize the analyzed fault, to:
select the set of profile echo canceller coefficients having the highest correlation coefficient; and
when the highest correlation coefficient is greater than a threshold correlation value, provide a first attribute associated with the selected set of profile echo canceller coefficients.

87. The line interface unit of claim 86, further comprising a second interface, coupled to the first interface, adapted to couple the line interface unit to a second communication link.

88. The line interface unit 86, wherein the echo canceller profile is generated using a communication medium that is configured to model an expected operating environment.

89. The line interface unit of claim 86, wherein the echo canceller profile includes at least one set of profile echo canceller coefficients associated with a communication medium having a plurality of sections, each section having at least one medium attribute.

90. The line interface unit of claim 89, wherein the medium attribute is a gauge.

91. The line interface unit of claim 89, wherein the medium attribute of at least one of the plurality of sections is different from the medium attribute of at least one of the other sections.

92. The line interface unit claim 91, wherein the echo canceller profile includes at least one set of profile echo canceller coefficients associated with a telephone line having a 1000 foot section of 24 AWG wire and an 8000 foot section of 26 AWG wire.

93. The line interface unit of claim 86, wherein the controller is adapted to, when the highest correlation coefficient is greater than the threshold correlation value, provide the correlation coefficient associated with the selected set of profile echo canceller coefficients.

94. The line interface unit of claim 86, wherein the controller is further adapted to:
when the highest correlation coefficient is less than the threshold correlation value, select N sets of profile echo canceller coefficients having the N highest correlation coefficients, wherein N is a number greater than one; and
provide a second attribute associated with each of the N selected sets of profile echo canceller coefficients.

95. The line interface unit of claim 94, wherein the controller is further adapted to, when the highest correlation coefficient is less than the threshold correlation value, provide the correlation coefficient associated with each of the N selected sets of profile echo canceller coefficients.

96. The line interface unit of claim 94, wherein the second attribute is a type of a fault associated with each of the N selected sets of profile echo canceller coefficients.

97. The line interface unit of claim 94, wherein the second attribute is a location of a fault associated with each of the N selected sets of profile echo canceller coefficients.

98. The line interface unit of claim 86, wherein the first attribute is a type of a fault associated with the selected set of profile echo canceller coefficients.

99. The line interface unit of claim 86, wherein the first attribute is a location of a fault associated with the selected set of profile echo canceller coefficients.

100. The line interface unit of claim 86, wherein the first communication link includes at least one twisted-pair telephone line.

101. The line interface unit of claim 100, wherein the first interface is adapted to couple the line interface unit to the at least one twisted-pair telephone line.

102. The line interface unit of claim 101, wherein the first communication link is an HDSL2 link.

103. The line interface unit of claim 102, wherein the first interface includes an HDSL2 framer.

104. The line interface unit of claim 100, wherein the first interface includes a hybrid circuit, coupled to the echo canceller, that is adapted to couple the line interface unit to the at least one twisted-pair telephone line.

105. The line interface unit of claim 86, wherein the controller includes:
a programmable processor coupled to the echo canceller;
a memory coupled to the programmable processor, wherein program instructions are stored in the memory, the program instructions operable to cause the programmable processor to:
receive the echo canceller profile;
correlate the set of first echo canceller coefficients with the subset of the plurality of sets of profile echo canceller coefficients included in the echo canceller profile to create the correlation coefficient for each set of the profile echo canceller coefficients included in the subset; and
characterize the analyzed fault based on the correlations between the set of first echo canceller coefficients and the subset of the plurality of the sets of profile echo canceller coefficients included in the echo canceller profile; and wherein the program instructions operable to cause the programmable process to characterize the analyzed fault include program instructions operable to cause the programmable processor to:
  select the set of profile echo canceller coefficients having the highest correlation coefficient; and
  when the highest correlation coefficient is greater than the threshold correlation value, provide the first attribute associated with the selected set of profile echo canceller coefficients.

106. A telecommunication device that analyzes an analyzed fault associated with an analyzed communication medium, the telecommunication device comprising:
  an interface adapted to couple the telecommunication device to a communication medium;
  an echo canceller coupled to the interface; and
  wherein the telecommunication device is adapted to:
    receive a plurality of sets of first echo canceller coefficients from the echo canceller, each of the sets of first echo canceller coefficients has an associated degree of convergence;
    select one of the plurality of sets of first echo canceller coefficients based on the degree of convergence associated with each of the plurality of sets of first echo canceller coefficients;
    receive an echo canceller profile, wherein the echo canceller profile includes at least one set of profile echo canceller coefficients;
    correlate the selected set of first echo canceller coefficients with at least one of the sets of profile echo canceller coefficients included in the echo canceller profile; and
    characterize the fault based on the correlation between the selected set of first echo canceller coefficients and the at least one of the sets of profile echo canceller coefficients included in the echo canceller profile.

107. The telecommunication device of claim 106, wherein the telecommunication device is further adapted, in order to select the selected set of first echo canceller coefficients, to select the set of first echo canceller coefficients having the highest degree of convergence.

108. The telecommunication device of claim 107, wherein the telecommunication device is further adapted to:
  determine which of the plurality of first echo canceller coefficients has the highest degree of convergence; and
  when the highest degree of convergence is greater than a threshold convergence value, select the set of first echo canceller coefficients having the highest degree of convergence.

109. The telecommunication device of claim 108, wherein the telecommunication device is further adapted to, when the highest degree of convergence is less than the threshold convergence value:
  determine which of the plurality of first echo canceller coefficients has the second highest degree of convergence; and
  correlate the set of first echo canceller coefficients having the highest degree of convergence with the set of first echo canceller coefficients having the second highest degree of convergence in order to create a correlation coefficient; and
  when the correlation coefficient is greater than a threshold correlation value, select the set of first echo canceller coefficients having the highest degree of convergence.

110. The telecommunication device of claim 106, wherein the controller is further adapted to:
  determine if there is a first correlation between the selected set of first echo canceller coefficients and at least one of the sets of profile echo canceller coefficients included in the echo canceller profile; and
  when there is the first correlation between the selected set of first echo canceller coefficients and at least one of the sets of profile echo canceller coefficients included in the echo canceller profile, determine that the analyzed fault has an attribute associated with the at least one set of profile echo canceller coefficients included in the echo canceller profile with which the selected set of first echo canceller coefficients has the first correlation.

111. A telecommunication device that analyzes an analyzed fault associated with an analyzed communication medium, the telecommunication device comprising:
  an interface adapted to couple the telecommunication device to a communication medium;
  an echo canceller coupled to the interface; and
  wherein the telecommunication device is adapted to:
    receive a plurality of second sets of information indicative of echo;
    select one of the second sets of information indicative of echo;
    correlate a first set of information indicative of echo associated with the analyzed communication medium with the selected second set; and
    characterize the analyzed fault based on the correlation between the first set and the selected second set.

112. The telecommunication device of claim 111, wherein the first set of information indicative of echo includes a set of first echo canceller coefficients and each of the second sets of information indicative of echo includes an echo canceller profile, wherein each echo canceller profile at least one set of profile echo canceller coefficients.

113. The telecommunication device of claim 112, wherein the telecommunication device is further adapted to determine a first attribute associated with the analyzed fault.

114. The telecommunication device of claim 113, wherein the telecommunication device is further adapted, in order to select one of second sets of information indicative of echo, to select one of the plurality of echo canceller profiles based on the first attribute.

115. The telecommunication device of claim 113, wherein the first attribute includes a fault type associated with the analyzed fault.

116. The telecommunication device of claim 114, wherein the telecommunication device is further adapted to:
  determine if there is a first correlation between the set of first echo canceller coefficients and at least one of the sets of profile echo canceller coefficients included in the selected echo canceller profile; and
  when there is the first correlation between the set of first echo canceller coefficients and at least one of the sets of profile echo canceller coefficients included in the selected echo canceller profile, determine that the analyzed fault has a second attribute associated with the at least one set of profile echo canceller coefficients included in the selected echo canceller profile with which the set of first echo canceller coefficients has the first correlation.

117. A telecommunication device that analyzes an analyzed fault associated with an analyzed communication medium, the telecommunication device comprising:
  an interface adapted to couple the telecommunication device to a communication medium;

an echo canceller coupled to the interface;
wherein the telecommunication device is adapted to:
receive an echo canceller profile, wherein the echo canceller profile includes a plurality of sets of profile echo canceller coefficients;
correlate a set of first echo canceller coefficients received from an echo canceller with at least a subset of the plurality of sets of profile echo canceller coefficients included in the echo canceller profile to create a correlation coefficient for each set of the profile echo canceller coefficients included in the subset; and
characterize the analyzed fault based on the correlations between the set of first echo canceller coefficients and the subset of the plurality of the sets of profile echo canceller coefficients included in the echo canceller profile; and
wherein the telecommunication device is further adapted, in order to characterize the analyzed fault, to:
select the set of profile echo canceller coefficients having the highest correlation coefficient; and
when the highest correlation coefficient is greater than a threshold correlation value, provide a first attribute associated with the selected set of profile echo canceller coefficients.

118. The telecommunication device of claim 117, wherein the telecommunication device is adapted to, when the highest correlation coefficient is greater than the threshold correlation value, provide the correlation coefficient associated with the selected set of profile echo canceller coefficients.

119. The telecommunication device of claim 117, wherein the telecommunication device is further adapted to:
when the highest correlation coefficient is less than the threshold correlation value, select N sets of profile echo canceller coefficients having the N highest correlation coefficients, wherein N is a number greater than one; and
provide a second attribute associated with each of the N selected sets of profile echo canceller coefficients.

120. The telecommunication device of claim 119, wherein the telecommunication device is further adapted to, when the highest correlation coefficient is less than the threshold correlation value, provide the correlation coefficient associated with each of the N selected sets of profile echo canceller coefficients.

121. The telecommunication device of claim 119, wherein the second attribute is a type of a fault associated with each of the N selected sets of profile echo canceller coefficients.

122. The telecommunication device of claim 119, wherein the second attribute is a location of a fault associated with each of the N selected sets of profile echo canceller coefficients.

123. The telecommunication device of claim 117, wherein the first attribute is a type of a fault associated with the selected set of profile echo canceller coefficients.

124. The telecommunication device of claim 117, wherein the first attribute is a location of a fault associated with the selected set of profile echo canceller coefficients.

* * * * *